US012412491B1

(12) United States Patent
Breathnach

(10) Patent No.: US 12,412,491 B1
(45) Date of Patent: Sep. 9, 2025

(54) SYSTEM FOR ADVERTISING

(71) Applicant: Antaine Seosaimh Breathnach, Dublin (IE)

(72) Inventor: Antaine Seosaimh Breathnach, Dublin (IE)

( * ) Notice: Subject to any disclaimer, the term of this patent is extended or adjusted under 35 U.S.C. 154(b) by 0 days.

(21) Appl. No.: 18/979,700

(22) Filed: Dec. 13, 2024

Related U.S. Application Data

(63) Continuation of application No. 18/678,468, filed on May 30, 2024, now abandoned.

(51) Int. Cl.
*G09F 21/04* (2006.01)

(52) U.S. Cl.
CPC .................................. *G09F 21/042* (2020.05)

(58) Field of Classification Search
CPC ............. G09F 15/0062; G09F 15/0068; G09F 13/044; G09F 13/0446; G09F 21/04; G09F 21/042
See application file for complete search history.

(56) References Cited

U.S. PATENT DOCUMENTS 3,622,980 A * 11/1971 Elledge, Jr. ...... G08G 1/096783 340/908
3,715,044 A * 2/1973 Simons ..................... B60P 3/38 224/328
3,761,890 A * 9/1973 Fritts ....................... G09F 21/04 116/28 R
4,259,660 A * 3/1981 Oliver .................. B60Q 1/2611 362/523
5,348,207 A * 9/1994 Frank ...................... B60R 9/055 224/310
5,657,566 A 8/1997 Key
5,897,158 A 4/1999 Henke et al.
7,154,383 B2 * 12/2006 Berquist ................ G09F 21/04 340/425.5
8,341,859 B2 * 1/2013 Culiver .................. G09F 19/22 40/606.01
9,135,842 B1 * 9/2015 Riley .................... G09F 21/048
10,636,335 B2 4/2020 Kis-Benedek Pinero et al.
2005/0012598 A1 1/2005 Berquist
2006/0267796 A1 * 11/2006 Oskroba ................ G09F 21/04 340/908
2008/0030427 A1 * 2/2008 Lanham .................. G09F 21/04 345/2.3
2017/0132960 A1 * 5/2017 Kis-Benedek Pinero .................. G06F 1/1637
2019/0266930 A1 8/2019 Lanham

FOREIGN PATENT DOCUMENTS

DE 202006014589 U1 * 3/2007 ............. G09F 21/04
KR 20010107789 12/2001

* cited by examiner

*Primary Examiner* — Cassandra Davis
(74) *Attorney, Agent, or Firm* — Michael D. Eisenberg

(57) ABSTRACT

A system for advertising on a roof, the system comprising a protective casing and an automated actuating assembly. The protective casing is configured to contain an advertising item. The automated actuating assembly is joined to the protective casing and is configured to move the protective casing between a retracted configuration and a vertical configuration. In the retracted configuration the protective casing is oriented to be parallel to a roof. In the standing configuration the protective casing is oriented vertically to enable the advertising to be viewed.

18 Claims, 23 Drawing Sheets

SYSTEM FOR ADVERTISING

CROSS-REFERENCES TO RELATED APPLICATIONS

The present application is a continuation-in-part application of U.S. application Ser. No. 18/678,468 filed on May 30, 2024, which is hereby incorporated in its entirety.

TECHNICAL FIELD

The present invention relates to systems and methods for the placement of video screens and physical product displays for the purpose of distributing information, such as advertisements.

BACKGROUND OF THE INVENTION

An imbalance in international trade between Asia and Western Europe and the Americas has led to a significant increase in the scale of empty shipping containers on the return leg of a journey (container repositioning after original delivery of product to customers). The cost of returning empty containers to origin or other location can be partially or fully offset by generating a secondary source of revenue for shipping containers. This can ultimately reduce international or domestic market shipping costs for customers and suppliers.

Moreover, roofs, such as roofs of delivery vehicles, trains, trams, and buses present empty spaces that can be used to generate a revenue stream.

Moreover, expos and shows are used to advertise new products. Some of these products may be premium products, which should be displayed in a way that they can be viewed, but also protected from theft, poor weather conditions, or other unfavorable conditions.

BRIEF SUMMARY OF EMBODIMENTS OF THE INVENTION

There is therefore a need for a system and method for using roofs of containers, delivery vehicles, trains, trams, buses, as advertising spaces to generate new revenue streams.

There is also a need for a system and method for holding and protecting an advertising item (which may include a physical product being advertised or a screen showing a video or images related to a product or service being advertised) in a show room or other display settings.

Therefore, an aspect of some embodiments of the invention relates to a system for advertising on a roof, the system includes a protective casing and an automated actuating assembly. The protective casing is configured to contain an advertising item. The automated actuating assembly is joined to the protective casing and is configured to move the protective casing between a retracted configuration and a standing configuration. In the retracted configuration the protective casing is oriented to be parallel to a roof. In the standing configuration, the protective casing is oriented vertically and has an elevation above an upper surface of the roof that is adjustable to be at any one of a plurality of predetermined heights.

In a variant, in the standing configuration, the plurality of predetermined heights includes predetermined discrete heights above the upper surface of the roof or includes all the heights within a range between a minimal height above the upper surface of the roof and a maximal height above the upper surface of the roof.

In another variant, the automated actuating assembly is further configured to move the protective casing to a hanging configuration, in which the protective casing is oriented vertically and hangs ahead of a side of the roof.

In yet another variant, the automated actuating assembly includes at least one first telescopic shaft, a first actuator, at least one second telescopic shaft, and a second actuator. The at least one first telescopic shaft has a first end and a second end, the first end being rotatably joined to an upper surface of the roof and the second end being rotatably joined to the protective casing. The at least one first telescopic shaft is extendable along a central axis of the at least one first telescopic shaft and is rotatable about a horizontal axis. The first actuator is configured to control an extension and retraction of the at least one first telescopic shaft. The at least one second telescopic shaft is rotatably joined to the upper surface of the roof and rotatably joined to the protective casing. The second actuator configured to control an extension and retraction of the at least one second telescopic shaft.

In a further variant, the protective casing comprises a rear plate and a transparent sheath. The rear plate has a rear surface rotatably joined to the second end of the at least one first telescopic shaft. The transparent sheath js joined to a front surface of the rear plate and containing the advertising item.

In yet a further variant, the system includes at least a wheel joined to the protective casing, to ease a motion of the protective casing on the roof.

In a further variant, the system includes at least a damping unit joined to a front surface of the protective casing, to prevent direct contact between the protective casing and the roof when the protective casing is in the retracted configuration, wherein the damping unit comprises a vibration absorbing material.

In a further variant, the system includes a locking apparatus joined to the protective casing and configured to be remotely controllable for locking the protective casing to the roof.

In a variant, the system includes a cord anchored to the roof and joined to the protective casing. The cord is slack when the protective casing is in the retracted configuration, and tenses when the protective casing is moved to the hanging configuration.

In another variant, the system includes a retention apparatus configured to retain the advertising item firmly joined to the rear plate inside the transparent sheath.

In a variant, the system includes a control unit configured to control an operation of the at least one first telescopic shaft and the at least one second telescopic shaft to move the protective casing to one or more desired locations.

In a further variant, the control unit comprises a processing unit, a signal generator, and a non-transitory memory unit, the non-transitory memory unit storing machine-readable instructions for controlling the at least one first telescopic shaft and the at least one second telescopic shaft to move the protective casing from a predetermined initial position to a predetermined final position. The processor is configured to process the machine-readable instructions and output instructions accordingly. The signal generator is configured to generate control signals for operating the first actuator and the second actuator according to the output instructions, and to transmit the control signals to the first actuator and the second actuator according to a timing defined in the control instructions.

In yet another variant, the protective casing is waterproof.

In a variant, the transparent sheath is removably joined to a front surface of the rear plate.

In another variant, the protective casing covers the advertising item from at least front and back.

In a further variant, the protective casing envelops the advertising item from all sides.

Another aspect of some embodiments of the present invention relates to system for advertising on a roof, the system comprising a protective casing and an automated actuating assembly. The protective casing is configured to contain an advertising item. The automated actuating assembly is joined to the protective casing and configured to move the protective casing between a retracted configuration and a hanging configuration. In the retracted configuration the protective casing is oriented to be parallel to a roof. In the hanging configuration, the protective casing is oriented vertically and hangs ahead of a side of the roof.

In a variant, the automated actuating assembly is further configured to move the protective casing to a standing configuration, wherein in the standing configuration, the protective casing is oriented vertically and has an elevation above an upper surface of the roof.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
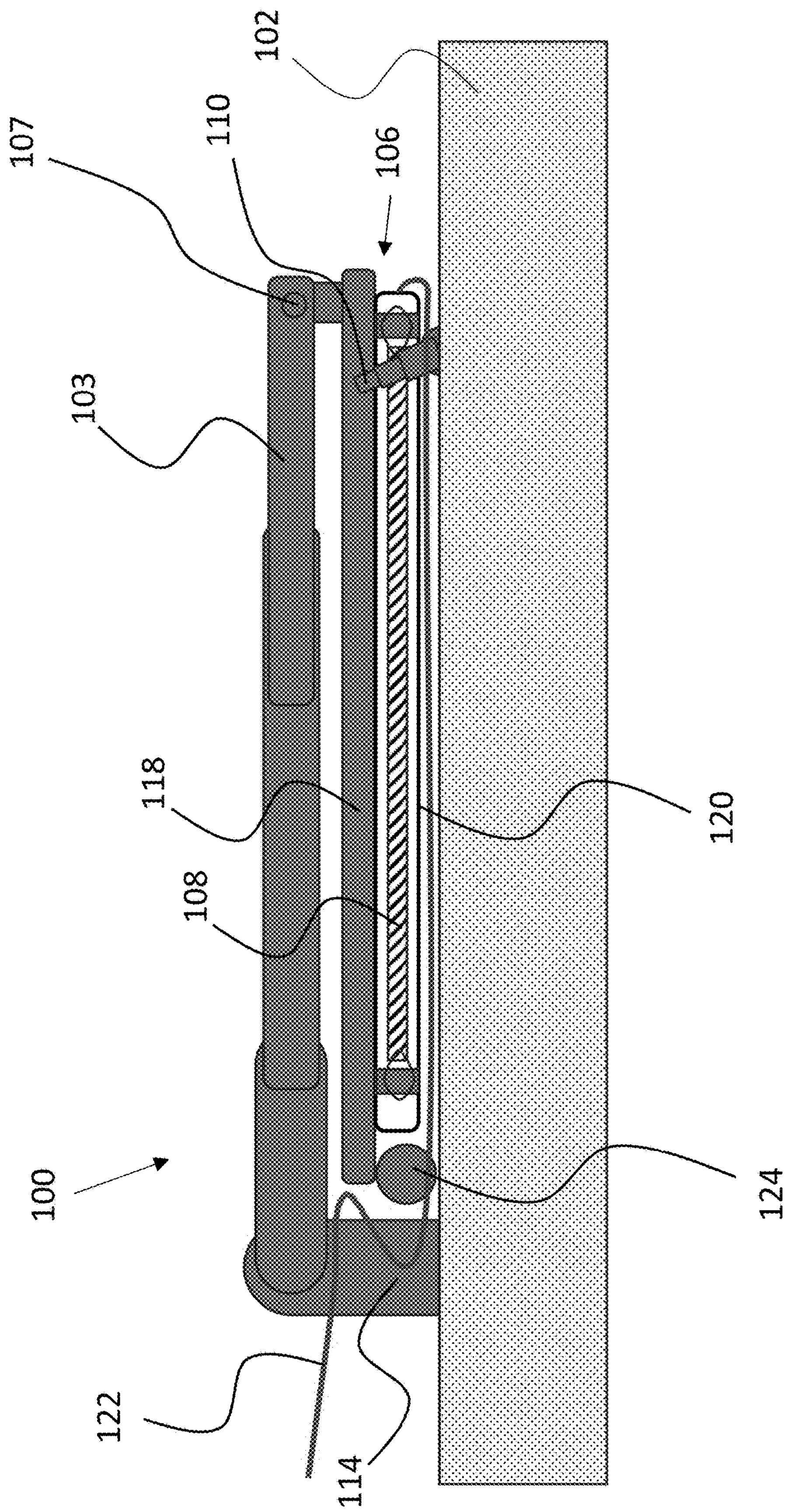
FIG. 1 illustrates a system for holding an advertising item on a roof, according to some embodiments of the present invention.

FIG. 1 illustrates a system for advertising 100 on a roof 102, according to some embodiments of the present invention.

It should be noted that the term "roof" herein refers to a top surface of an object. The roof may be the roof of a container, a vehicle, a table, a pedestal, for example.

The system 100 includes a protective casing 106, and an automated actuating assembly joined to the protective casing and configured to move the protective casing between a retracted configuration and a standing configuration, and optionally a hanging configuration. The protective casing 106 is configured to hold and contain one or more advertising items. The advertising items may include a display 108, and/or a product being advertised. The display 108 is a monitor that displays an image or a video. In some embodiments of the present invention, the protective casing is designed to cover the advertising item(s) at least from the front and back, and optionally from other sides as well. This ensures that the advertising item(s) is (are) protected from the elements.

In the retracted configuration the protective casing is oriented to be parallel to the roof. The advertising item faces the roof and is not viewable. In the standing configuration, the protective casing is oriented vertically and is located above an upper surface of the roof, such that he advertising item can be viewed. It should be noted that, in standing configuration, the height of the protective casing above the roof can be chosen from a plurality of heights. In the hanging configuration, the protective casing hangs ahead of the side of the roof, is oriented vertically, and has a rear side substantially flush with a side of the roof and optionally contacting the side or the roof.

Figure 21:
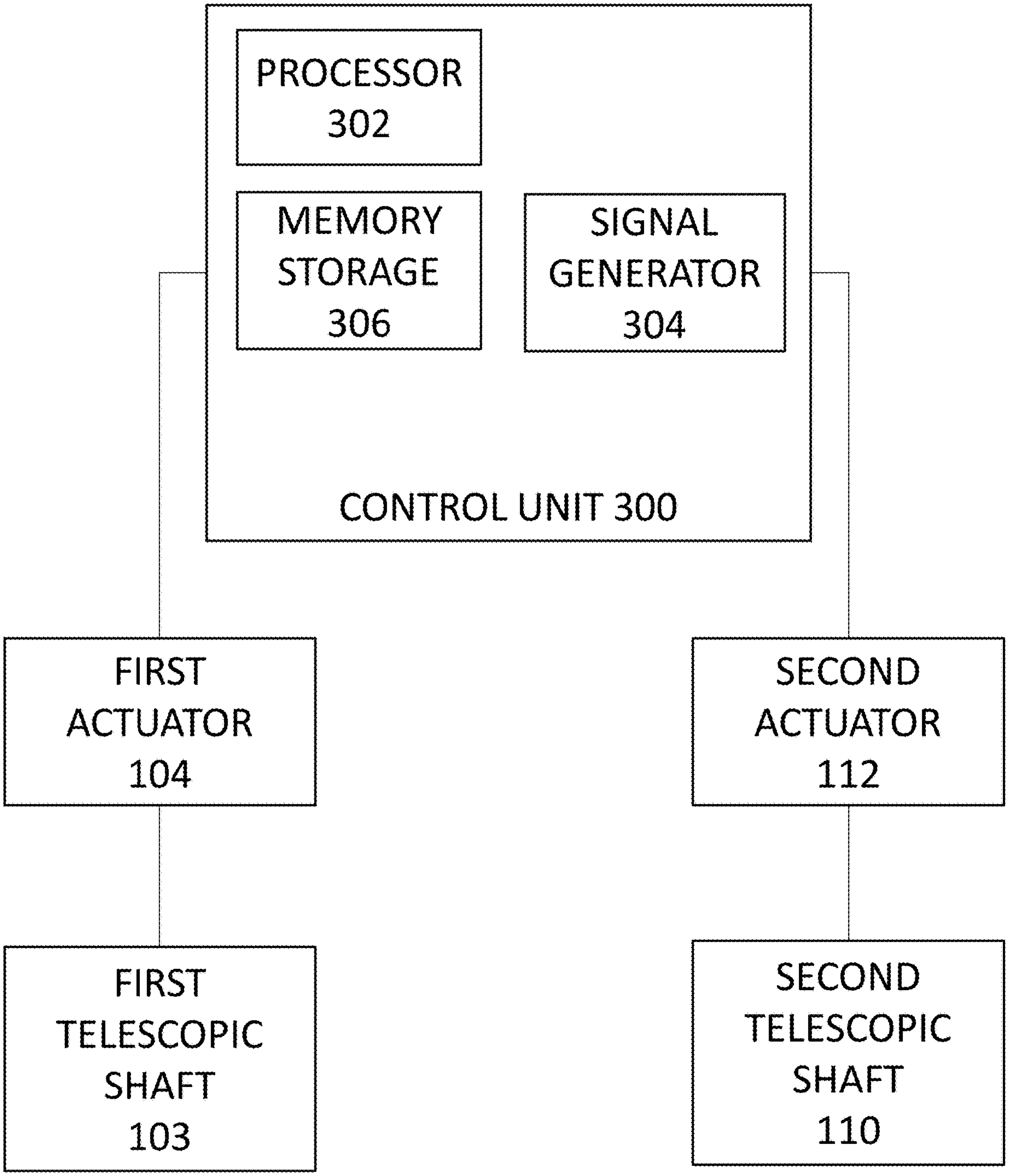
FIG. 21 is a box diagram illustrating control of the motion of the advertising system, according to some embodiments of the present invention.

In some embodiments of the present invention, the automated actuating assembly includes at least one first telescopic shaft 103, a first actuator 104 (shown in FIG. 21), at least one second telescopic shaft 110, and a second actuator 112 (shown in FIG. 21).

The first telescopic shaft 103 has a first end and a second end. The first end is rotatably joined to the upper surface of the roof 102. The second end is rotatably joined to the protective casing 106, for example, via a hinge 107. The first telescopic shaft 103 is telescopically extendable along a central axis of the first telescopic shaft and is rotatable with respect to the roof about a horizontal axis. The first actuator is configured to control an extension and retraction of the first telescopic shaft.

In some embodiments of the present invention, the system 100 includes a bracket 114. The bracket 114 is joined to the surface of the roof 102 and elevates the first end of the first telescopic shaft 103 above the roof, while keeping the first telescopic shaft 103 joined to the roof. The first telescopic shaft 103 is rotatable with respect to the bracket about a horizontal axis.

The protective casing 106 is rotatably joined to the second end of at least one telescopic shaft, and contains the advertising item(s) (e.g., display 108 and/or the physical product to be displayed 150). The protective casing 106 is designed to protect the advertising item from the elements. In some embodiments of the present invention, the protective casing is waterproof. The protective casing 106 has a transparent front surface that allows the advertising item to be visible from outside the protective casing 106. This allows the advertising item to be visible to the public.

In some embodiments of the present invention, the protective casing 106 includes a rear plate 118 and a transparent sheath 120. The rear plate 118 has a rear surface rotatably joined to the second end of the first telescopic shaft(s) 103. The transparent sheath 120 is joined to a front surface of the rear plate 118 and contains the advertising item(s). The transparent sheath and the link between the transparent sheath and the rear plate may be waterproof.

The second telescopic shaft 110 is rotatably joined to the upper surface of the roof 102 and rotatably joined to the protective casing 106. The second telescopic shaft 110 is telescopically extendable along a central axis of the second telescopic shaft and is rotatable about a horizontal axis. The second actuator 112 (illustrated in FIG. 21) is configured to control an extension and retraction of the second telescopic shaft.

In some embodiments of the present invention, the system 100 includes a cord 122 anchored to the roof 102 and joined to the protective casing 106. The cord 122 is slack when the protective casing is in the retracted configuration. For example, the cord 122 is slack when the first telescopic shaft 103 is horizontal and retracted, the second telescopic shaft 110 is retracted, and the protective case 106 is substantially parallel to the roof 102. The cord 122 tenses when the protective casing is moved to a location beyond which a placement of the protective casing is undesirable, as will be explained further below. In this manner, the cord keeps the protective casing 106 from moving beyond a certain distance from the location at which the cord is anchored.

In some embodiments of the present invention, the system 100 includes at least a wheel 124 joined to the protective casing 106, to ease a motion of the protective casing on the roof. The wheel may be joined to a portion of the protective casing 106 which is closest to the first end of the first telescopic shaft 103 and faces the roof 102 when the protective casing 106 is parallel to the roof.

Figure 19:
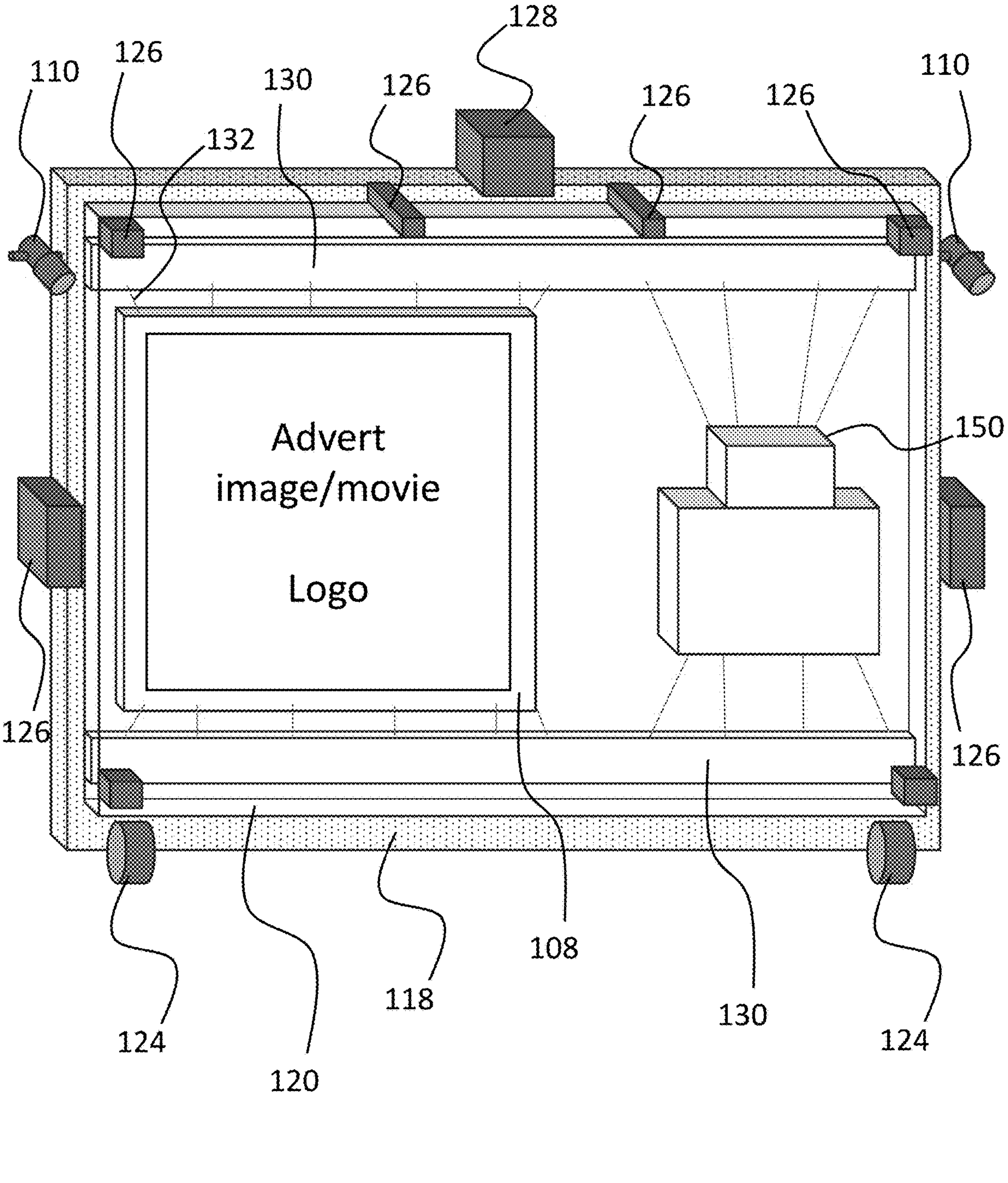
FIG. 19 is a front view of the protective casing, according to some embodiments of the present invention.
Figure 20:
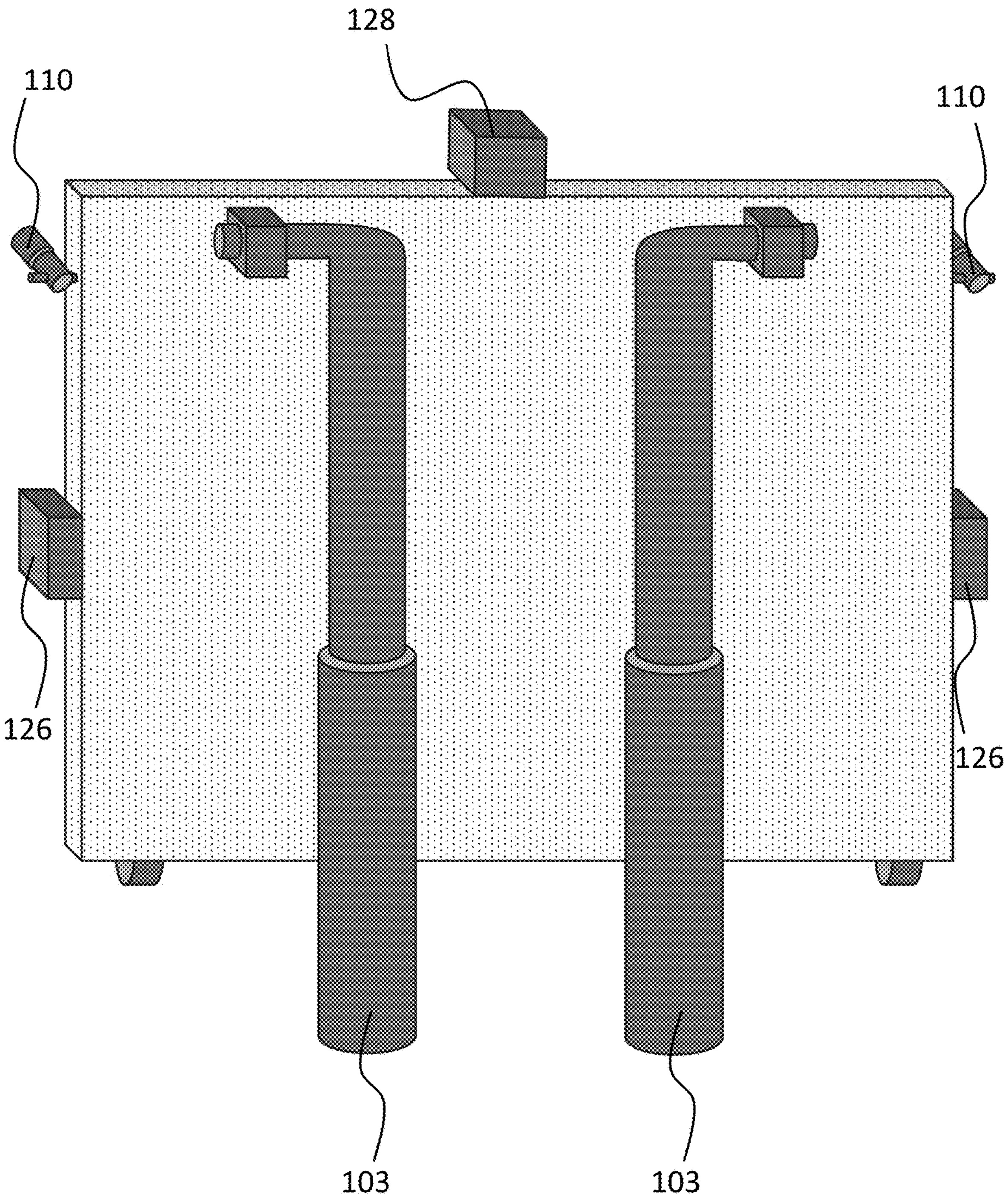
FIG. 20 is a rear view of the protective casing, according to some embodiments of the present invention.

Referring now to FIGS. 19 and 20, FIG. 19 is a front view of the protective casing, according to some embodiments of the present invention. FIG. 20 is a rear view of the protective casing, according to some embodiments of the present invention.

In some embodiments of the present invention, the system includes at least one damping unit 126 joined to the protective casing 106 or directly joined to the roof as a protective underlay material. The damping unit includes vibration absorbing material (such as foam for example) and is positioned to prevent direct contact between the protective casing and the roof when the protective casing is oriented to be parallel to the roof.

In the example of FIGS. 19 and 20, the damping unit(s) 126 is (are) placed on the side(s) of the rear plate 118 and protrude(s) forward beyond the transparent sheath 120. In this manner, the damping unit(s) 126 contact(s) the roof when the protective casing 106 is horizontal and both telescopic shafts are retracted. Thus, when the protective casing 106 is in a horizontal, retracted configuration, the damping unit(s) 126 act(s) as a spacer to keep the protective casing 106 from directly contacting the roof. The damping unit(s) 126 also protects the protective casing 106 and the adverting item(s) from sudden movements while in the horizontal retracted configuration, due to the shock absorbing and vibration absorbing property thereof. The damping unit(s) 126 may be located on the front surface of the rear plate 118 or on the front surface of the transparent sheath 120, as seen in FIG. 19.

In some embodiments of the present invention, the system includes a locking apparatus 128 (shown in FIG. 19) joined to the protective casing and configured to be remotely controllable for locking the protective casing to the roof. The locking apparatus 128 may include an electromagnet that is activated remotely to join the protective casing to a metallic roof when the protective casing is in the horizontal retracted configuration. Alternatively, the locking apparatus includes a loop joined to the roof and a hook joined to the protective casing and remotely controllable to move into a position to grip the loop when the protective casing is in the horizontal retracted configuration.

The first telescopic shaft 103 may include two first telescopic shafts 103 (shown in FIG. 20). The second telescopic shaft 110 may include two second telescopic shafts 110 (shown in FIG. 20). The second telescopic shafts 110 may be joined to sides of the rear plate 118, to the front of the rear plate 118, or to the transparent sheath 120.

The system may include a retention apparatus configured to retain the advertising item(s) joined to the rear plate 118 inside the transparent sheath 120, so that the advertising items(s) (i.e., the display 108 or the product to be advertised 150) does not move relative to the rear plate 118. In some embodiments of the present invention, the system includes two beams 130 (shown in FIG. 19) joined to the front surface of the rear plate 118, inside the transparent sheath 120. A plurality of cables 132 (shown in FIG. 19) firmly secure the advertising item(s) to the beams 130. Alternatively, the advertising item(s) is (are) directly joined (e.g., bolted, glued, or otherwise secured, fixedly or removably) to the front surface of the rear plate 118.

In some embodiments of the present invention, the transparent sheath is removably joined to the rear plate, to enable access to the space inside the transparent sheath to configure, repair, or remove a display, or to remove or replace a product.

Referring to FIGS. 2, 3, 4*a*, 4*b*, the system 100 for advertising on a roof 102 is shown, moving the advertising item(s) from a retracted horizontal configuration (FIG. 2) to a standing configuration (FIGS. 4*a* and 4*b*) above the roof, according to some embodiments of the present invention.

Figure 2:
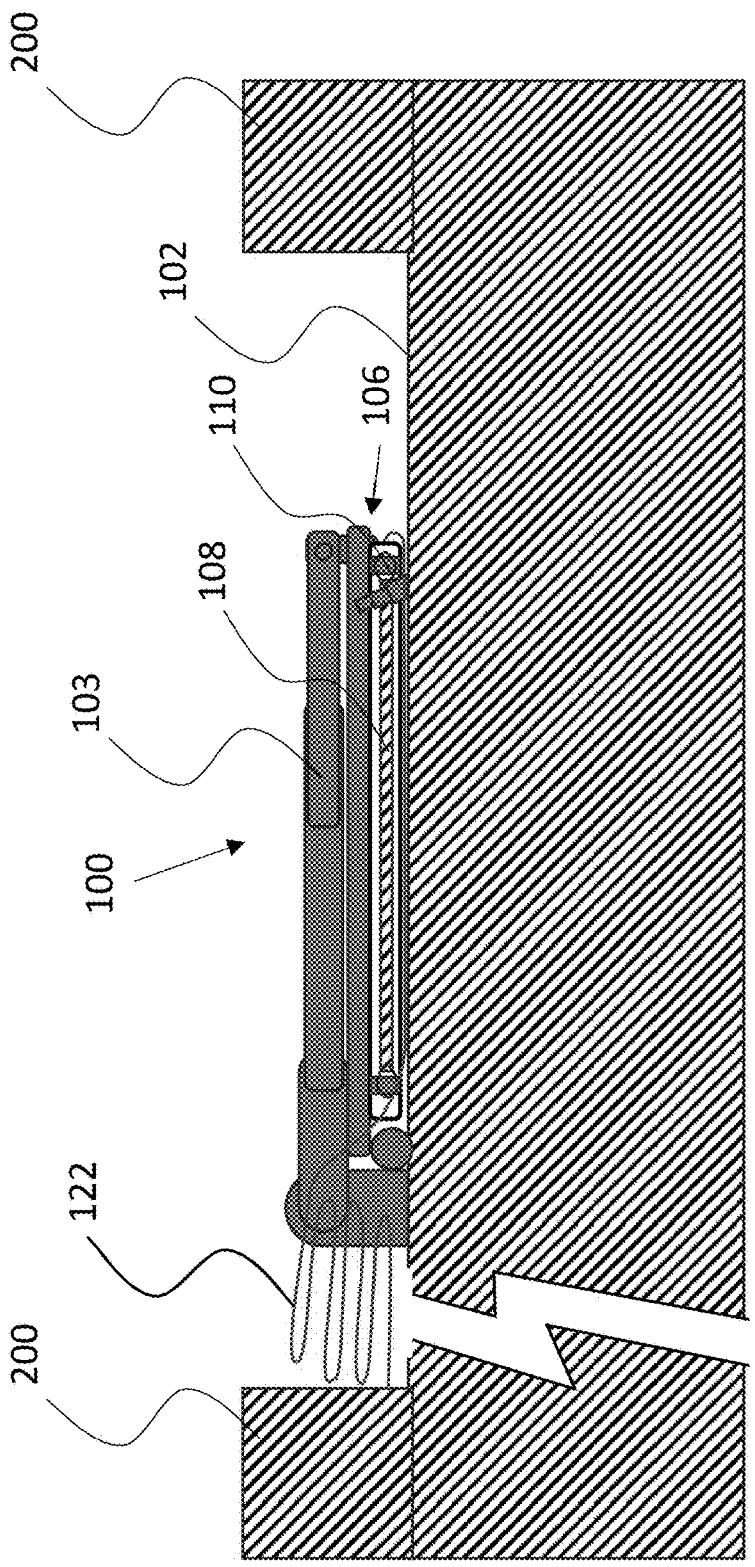
FIGS. 2, 3, 4*a*, and 4*b* illustrate a system for holding an advertising item, moving the advertising item from a retracted horizontal configuration to a standing configuration above the roof (at different heights of the standing configuration), according to some embodiments of the present invention.

In FIG. 2, the system 100 is in a retracted horizontal configuration. The first telescopic shaft 103 is retracted and horizontal while the second telescopic shaft 110 is retracted, such that the protective casing 106 is parallel to the roof 102 and elevated with respect to the roof 102. This configuration is advantageous, as it is compact and the display 108 (or other advertising item, such as the product 150 in FIG. 19) within the protective casing 106 is protected. If the system 100 is placed upon the roof of a container, the container has corner posts 200 that support a second container placed on top of the container upon which the system is placed. When the system 100 is in its retracted horizontal position, a second container can be placed on top of the container on which is the system 100, without contacting or damaging the system 100.

In the retracted horizontal position of the system 100, the cord 122 (if present) is slack.

Figure 3:
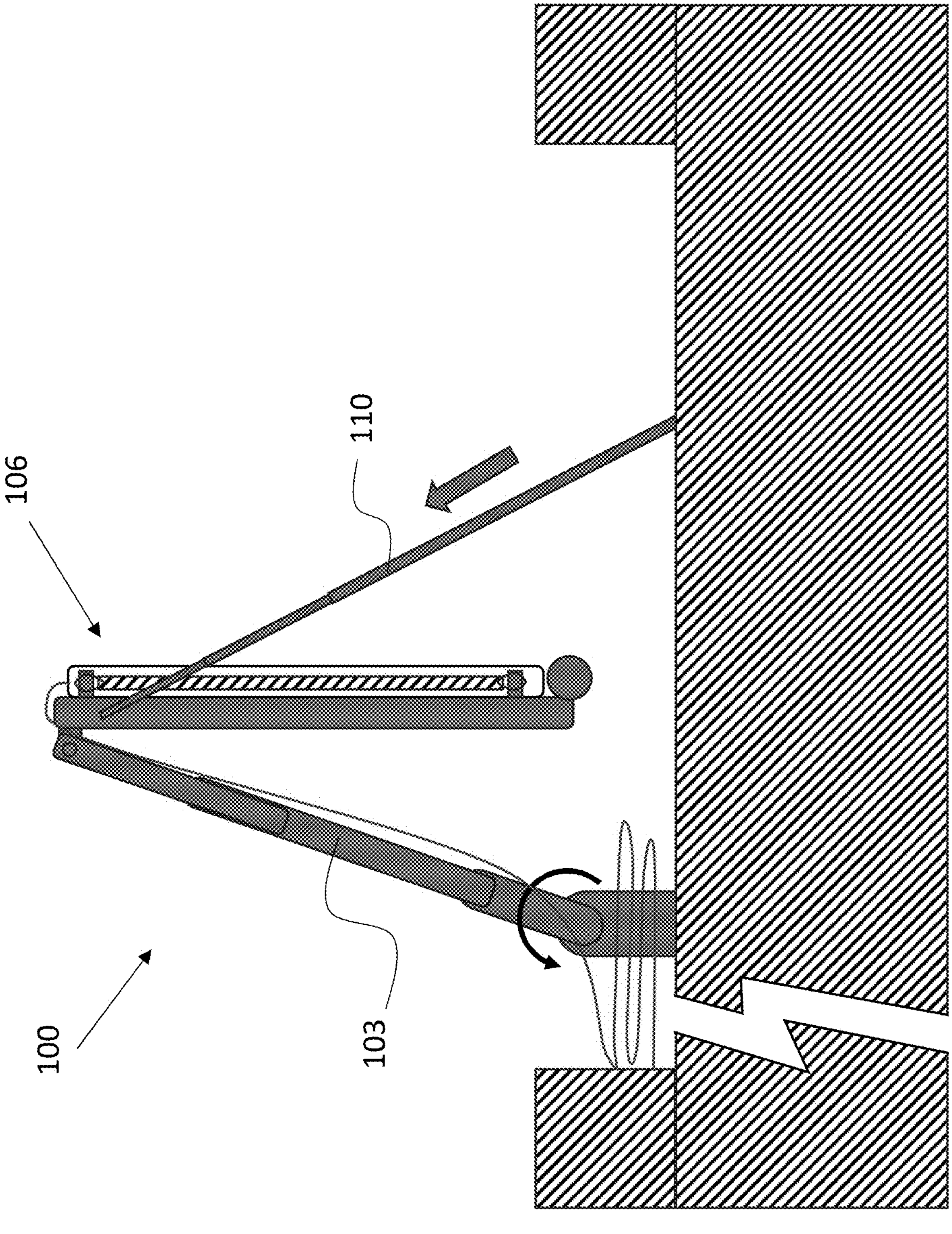

In some embodiments of the present invention, in FIG. 3, the second telescopic shaft 110 is extended, while the first telescopic shaft 103 is locked at its retracted length. This causes the first telescopic shaft 103 to rotate with respect to the roof 102. The second telescopic shaft 110 also rotates with respect to the roof 102. Because the protective casing 106 is rotatably joined to the first telescopic shaft, the protective casing 106 hangs from the first telescopic shaft 103. In some embodiments of the present invention, in FIG. 3, both the first telescoping shaft 103 and the second telescopic shaft 110 are extended, if a larger height is to be reached by the protective casing.

Figure 4A:
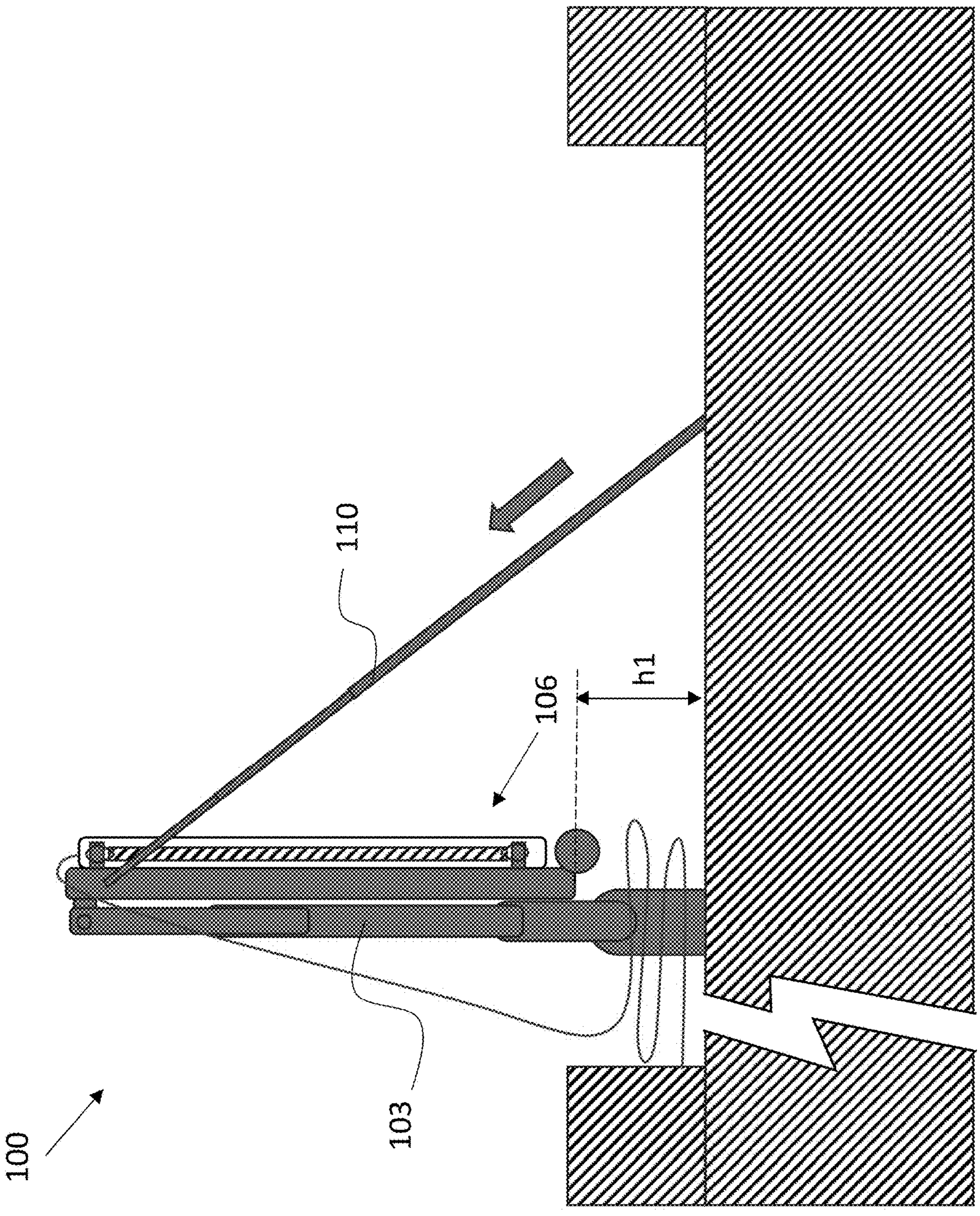

In FIG. 4*a*, after further extension of the second telescopic shaft 110, the standing configuration is reached at a first height h1 above the upper surface of the roof, in which the first telescopic shaft 103 is vertical. In this configuration, both telescopic shafts 103 and 110 are locked at their respective lengths to prevent motion of the protective casing 106, in order to keep the advertising item clearly visible.

Figure 4B:
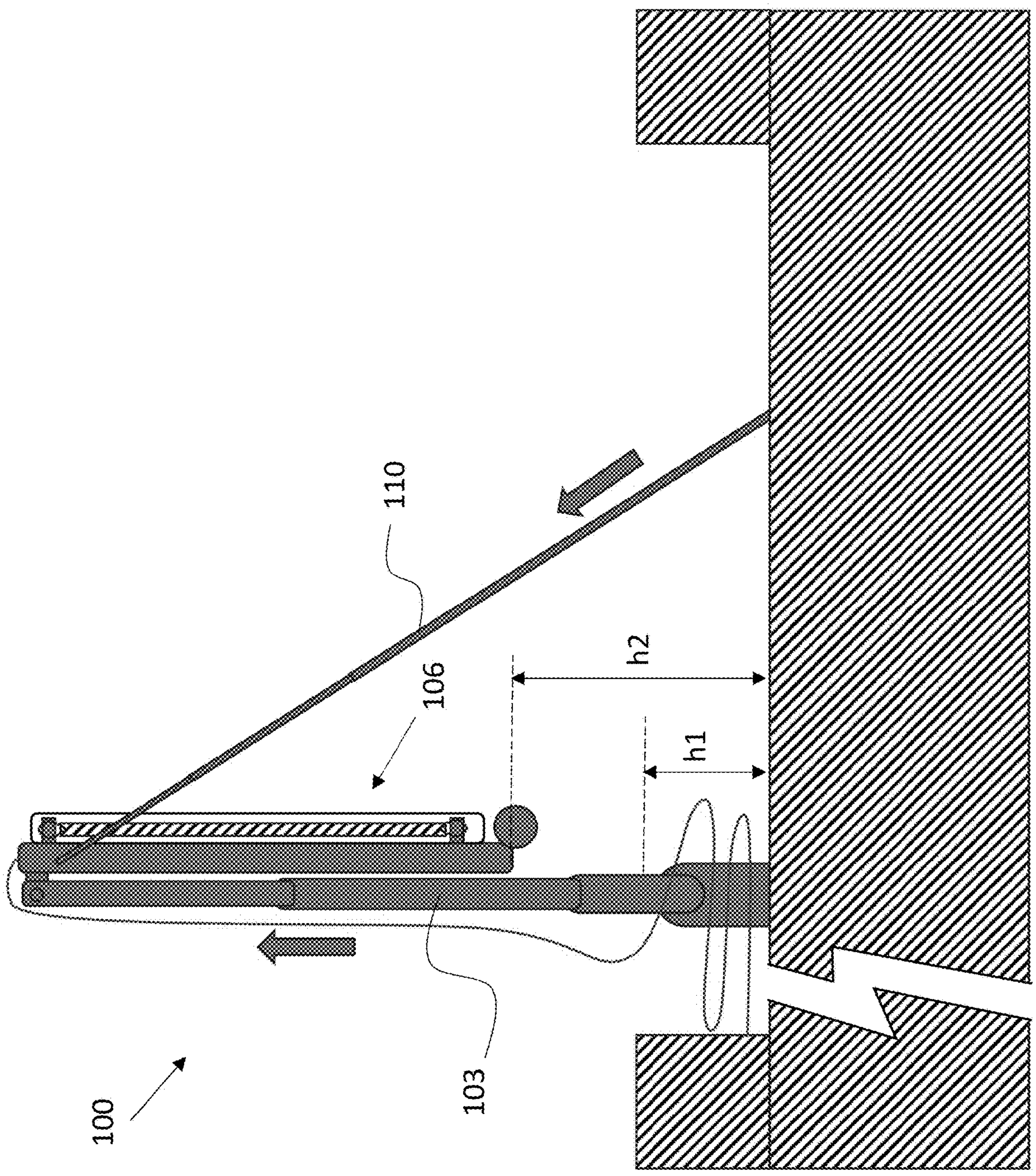

In FIG. 4*b*, the first telescoping shaft 103 and the second telescopic shaft 110 are both extended, to enable vertical motion of the protective casing 106, so the protective casing 106 can reach a desired height h2 (different from h1) above the roof. Therefore, the system of the present invention enables the height of the protective casing to be adjusted in the standing configuration. The height/elevation of the protective casing above the roof may be one of a plurality of predetermined heights. The plurality of predetermined heights may be predetermined discrete heights or may be all the heights included in a continuous range between a minimal height above the upper surface of the roof and a maximal height above the upper surface of the roof. It should be noted that in the examples of FIGS. 4*a* and 4*b*, the first telescoping shaft 103 is vertical. While keeping the first telescopic shaft 103 vertical allows for a higher maximal elevation of the protective casing above the upper surface of the roof, the first telescopic shaft 103 is not required to stand vertically at the standing configuration. A standing configuration can be achieved also if the telescoping shaft is not disposed vertically. Any of the positions of FIGS. 5 and 6, for example, is considered a standing configuration, because the protective casing is disposed vertically above the upper surface of the roof.

FIGS. 5-8 illustrate a system for advertising on a roof, moving the advertising screen from the standing configuration to a hanging configuration at the side of the roof, according to some embodiments of the present invention.

Figure 5:
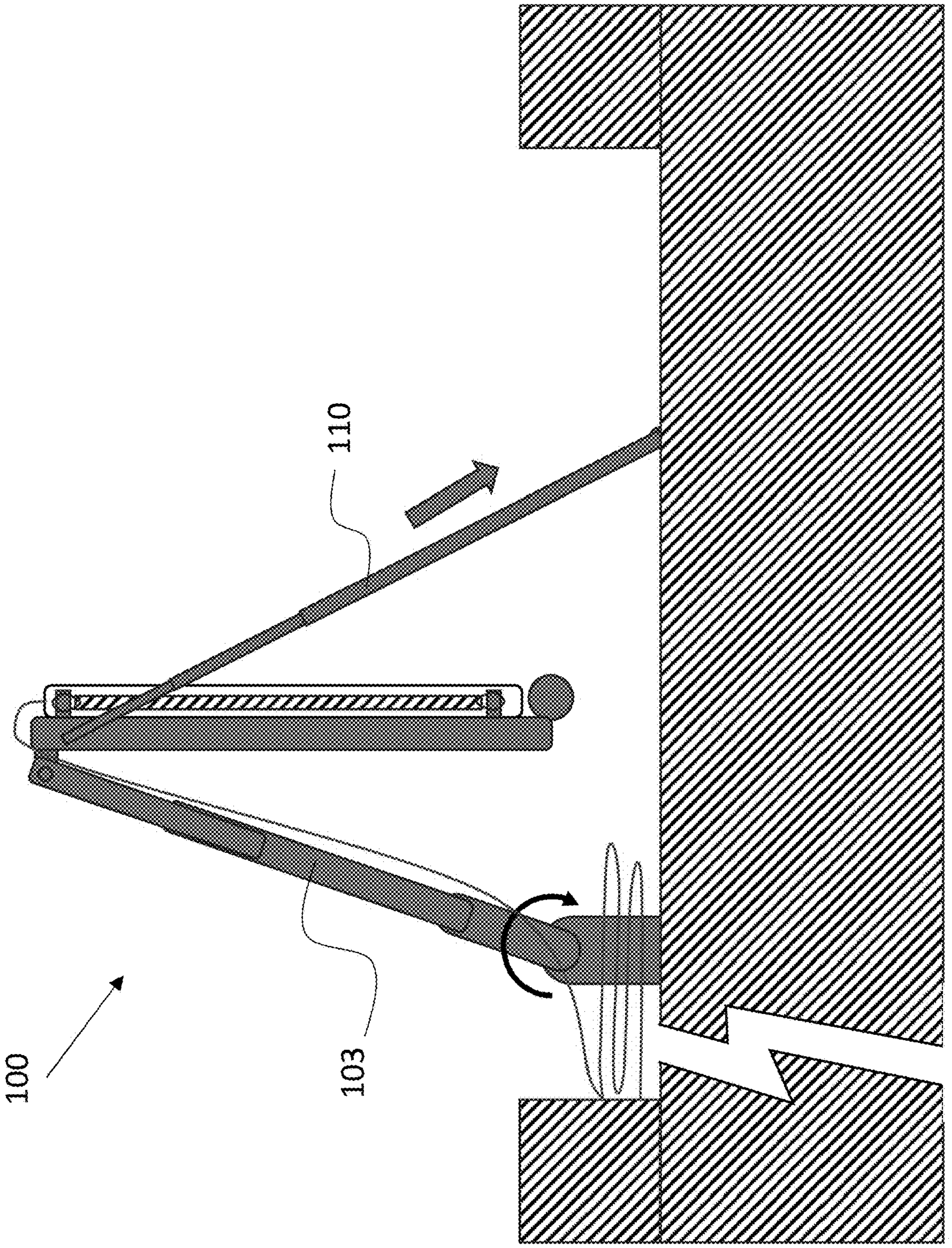
FIGS. 5-8 illustrate a system for holding an advertising item, moving the advertising item from the standing configuration to a hanging configuration at the side of the roof, according to some embodiments of the present invention.
Figure 6:
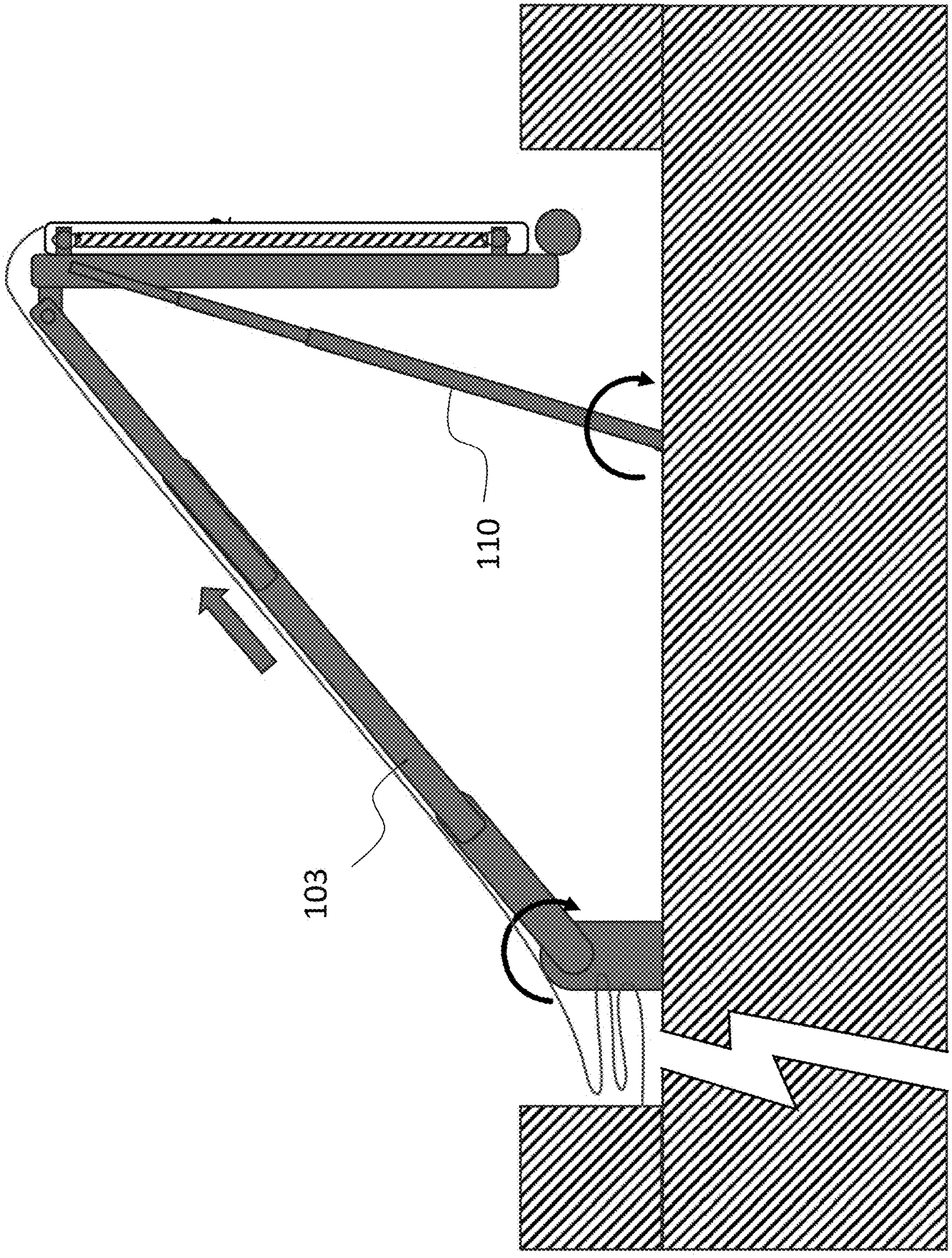
Figure 7:
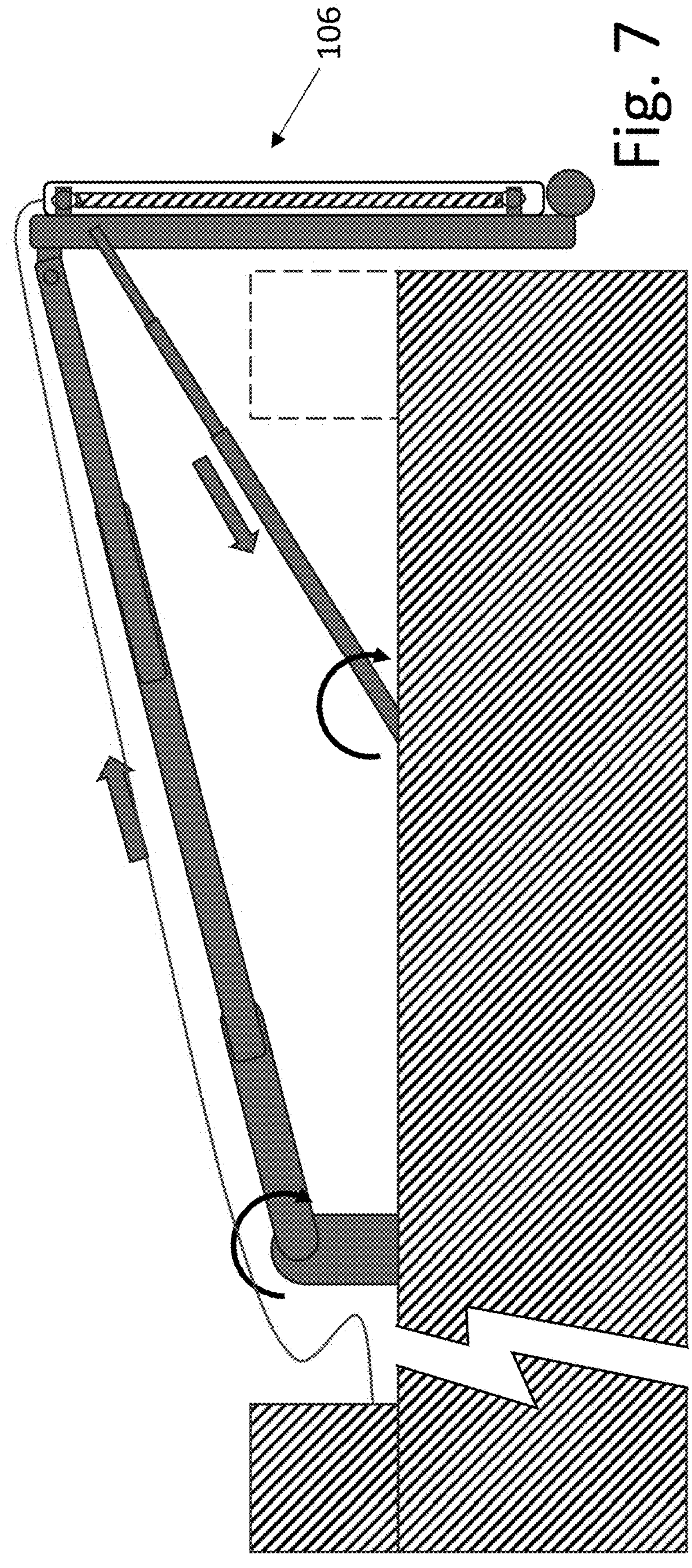
Figure 8:
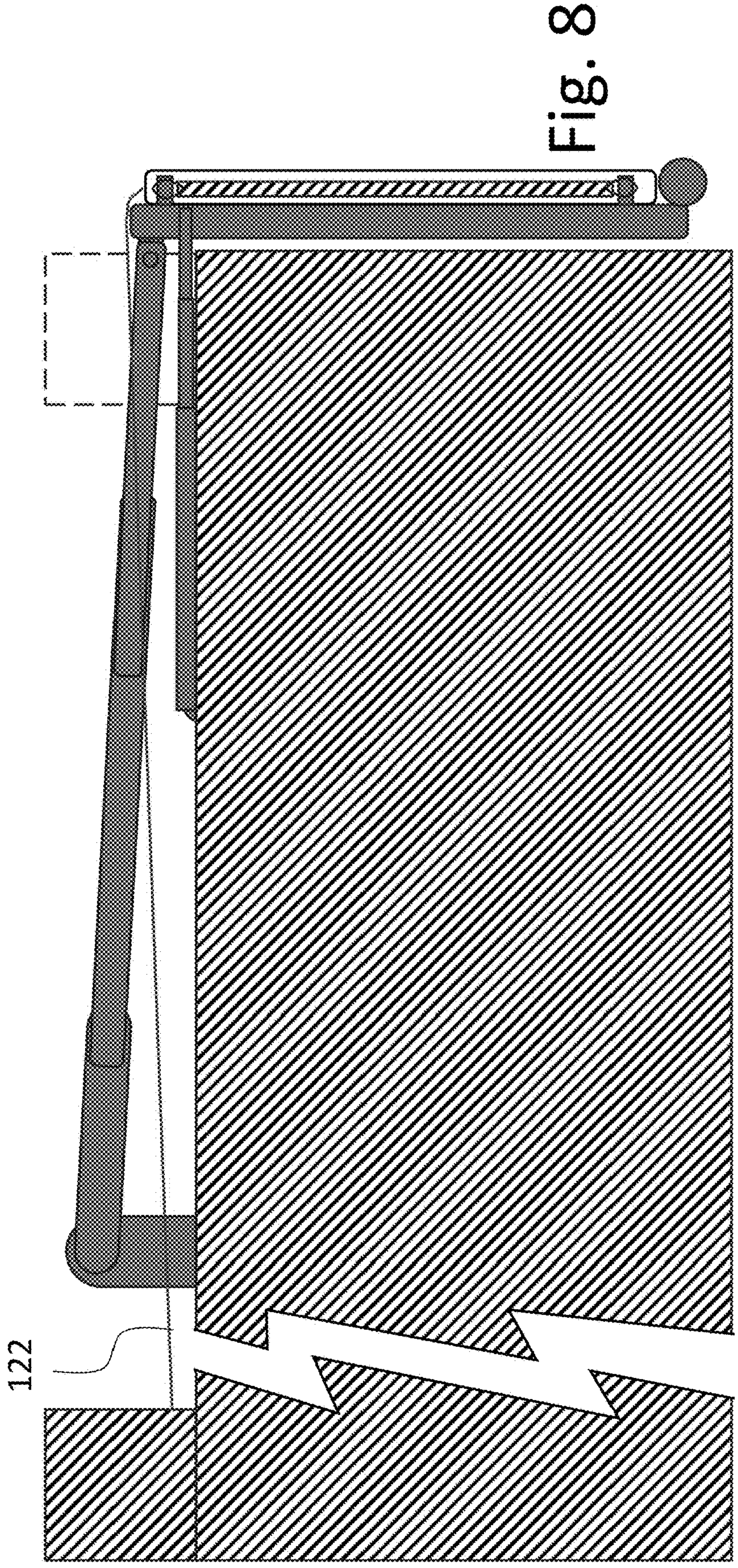
Figure 9:
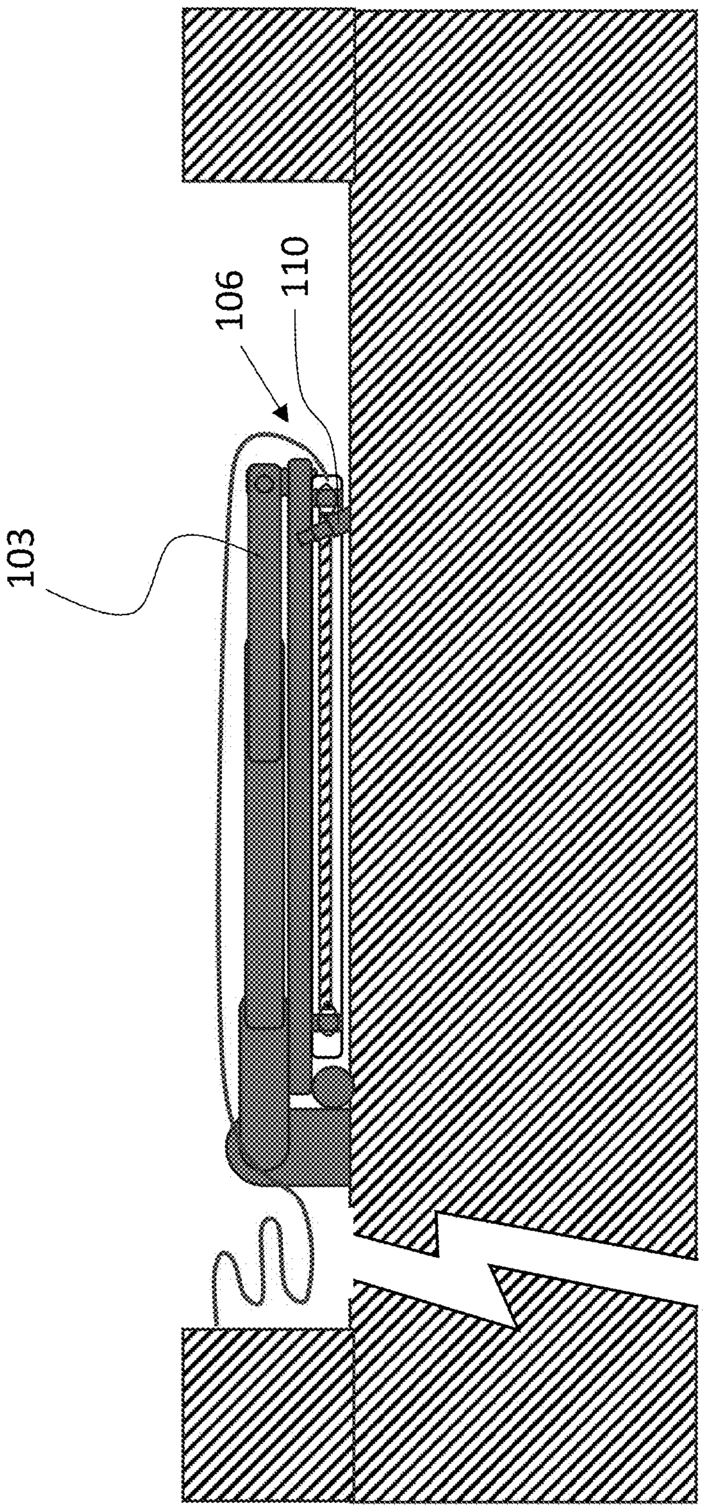
FIGS. 9-18 illustrate a system for holding an advertising item, moving from the retracted horizontal configuration directly to the hanging configuration at the side of the roof without the intermediate standing configuration, according to some embodiments of the present invention.

In FIG. 5, the second telescopic shaft 110 starts retracting. In FIG. 6 the first telescopic shaft 103 extends, while the second telescopic shaft 110 retracts further, thereby rotating both telescopic shafts toward the roof 102. In FIG. 7, the protective casing 106 has passed the edge of the roof. In FIG. 8, the protective casing 106 is brought downwards so that the protective casing hangs ahead of the side of the roof, and has a rear side that is substantially flush with the side of the roof and optionally contacts the side of the roof. The telescopic shafts 103 and 110 are locked. The cord 122 is taut to help prevent or decrease undesired motion of the protective casing 106. In some embodiments of the present invention, the cord is joined to the end of the protective casing 106 that is farthest from the first end of the first telescopic shaft 103. In this manner, if the connection between the first telescopic shaft 103 and the protective casing 106 breaks in the hanging configuration, the cord 122 keeps the protective casing in the hanging configuration and reduces the motion of the protective casing. In the hanging configuration, the advertising item(s) can be viewed.

The interplay of extension and retraction of the telescopic shafts 103 and 110 allows the motion of the protective casing 106. The specific example of FIGS. 2-8 is a non-limiting example. Different combinations of extensions and retractions of the telescopic shafts may be used to bring the protective casing 106 from a first position to a second position.

FIGS. 9-18 illustrate a system for advertising on a roof, moving from the retracted horizontal configuration (FIG. 9) directly to the hanging configuration (FIG. 18) at the side of the roof without the intermediate standing configuration, according to some embodiments of the present invention.

Figure 10:
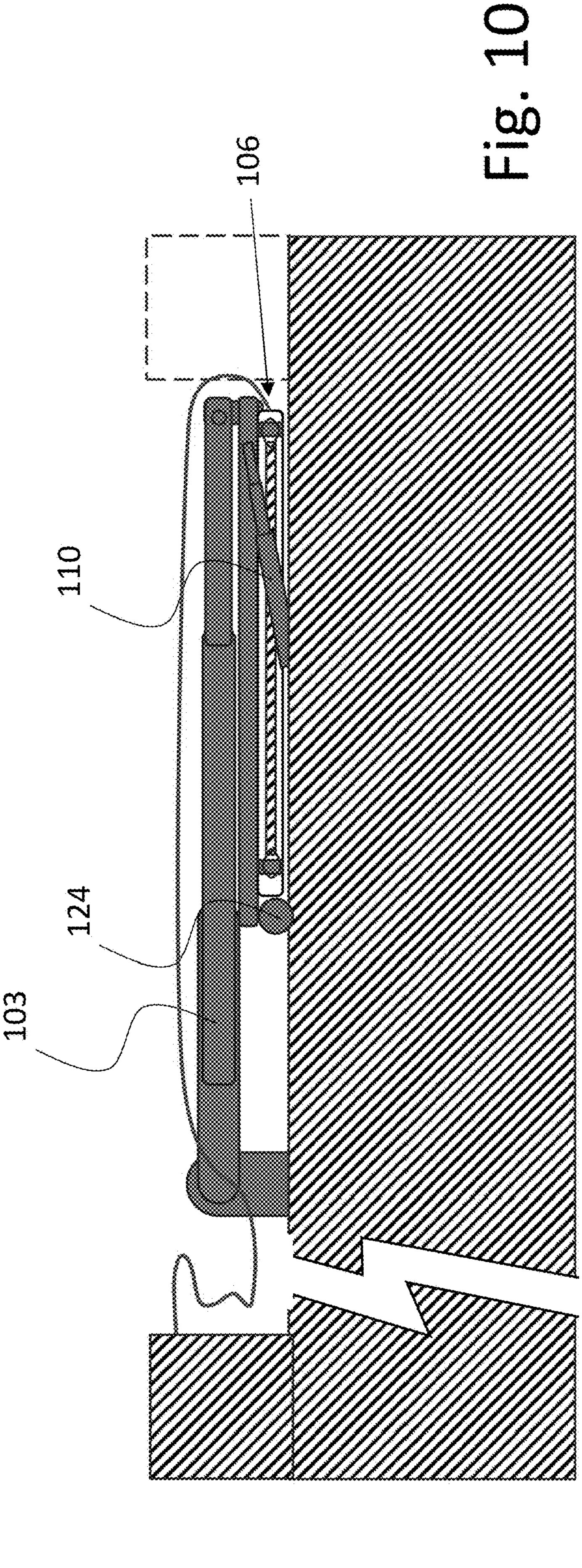
Figure 11:
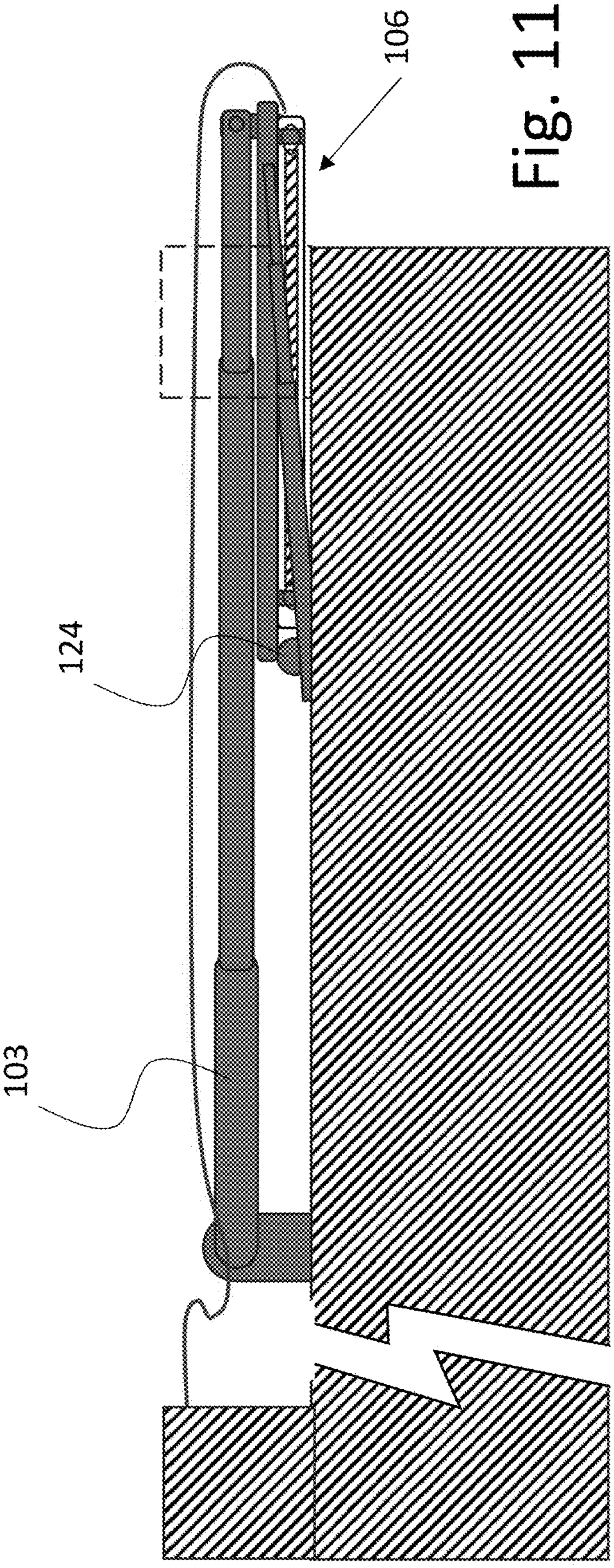

In FIGS. 10 and 11, the first telescopic shaft 103 is extended and kept horizontal. The second telescopic shaft 110 is unlocked and allowed to extend with the first telescopic shaft 103. The motion of the protective casing 106 along the roof 102 is eased by the wheel(s) 124.

Figure 12:
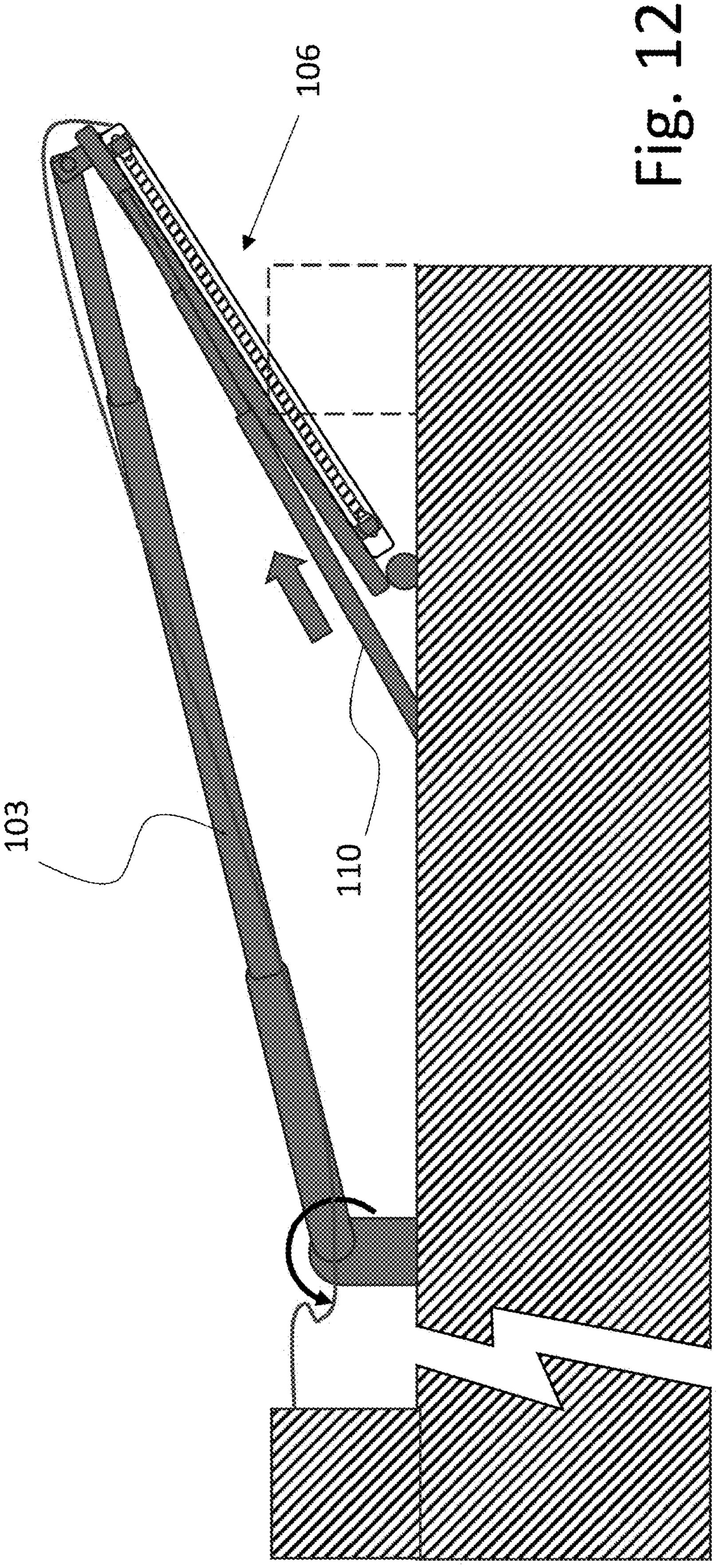
Figure 13:
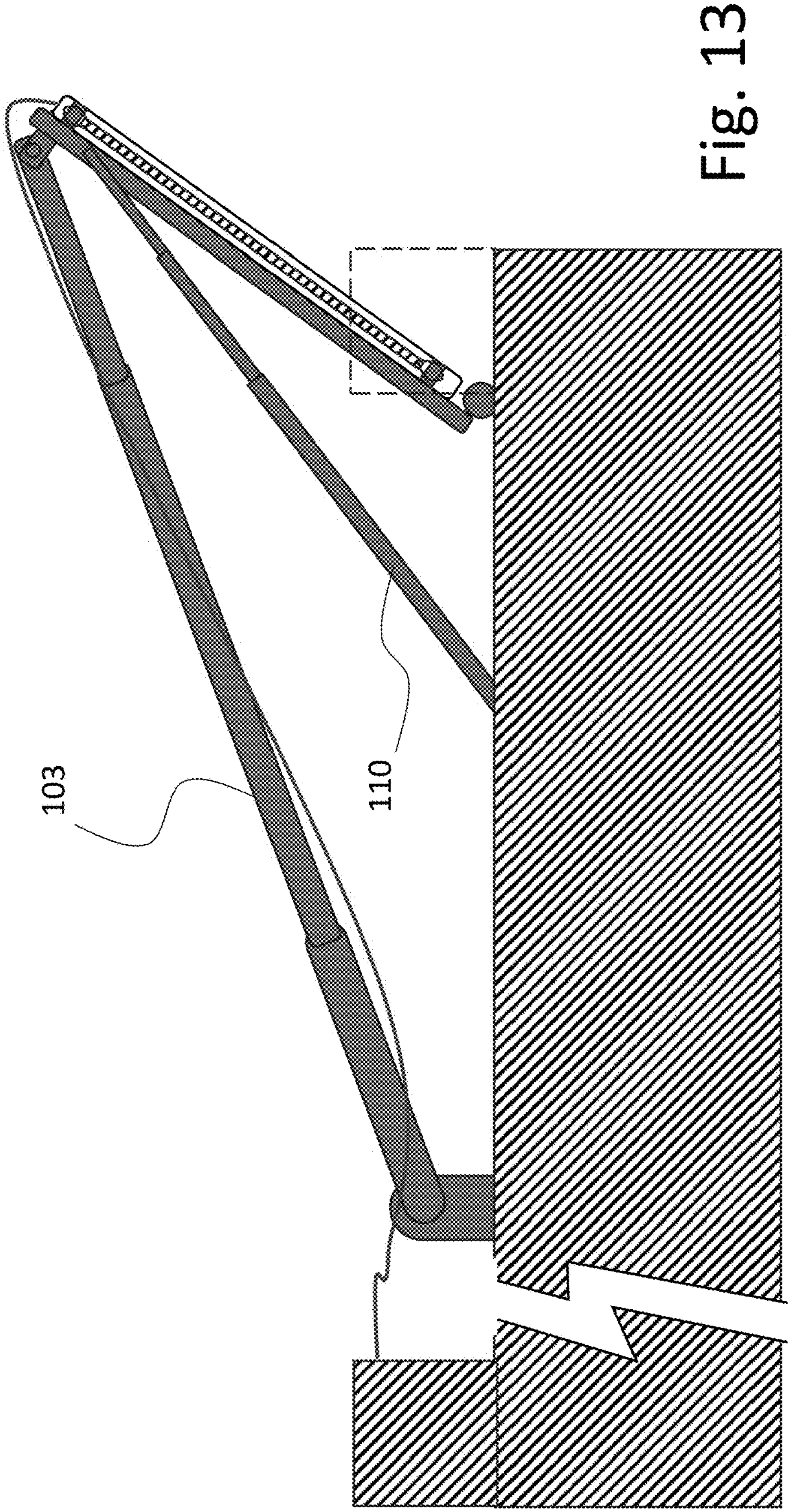
Figure 14:
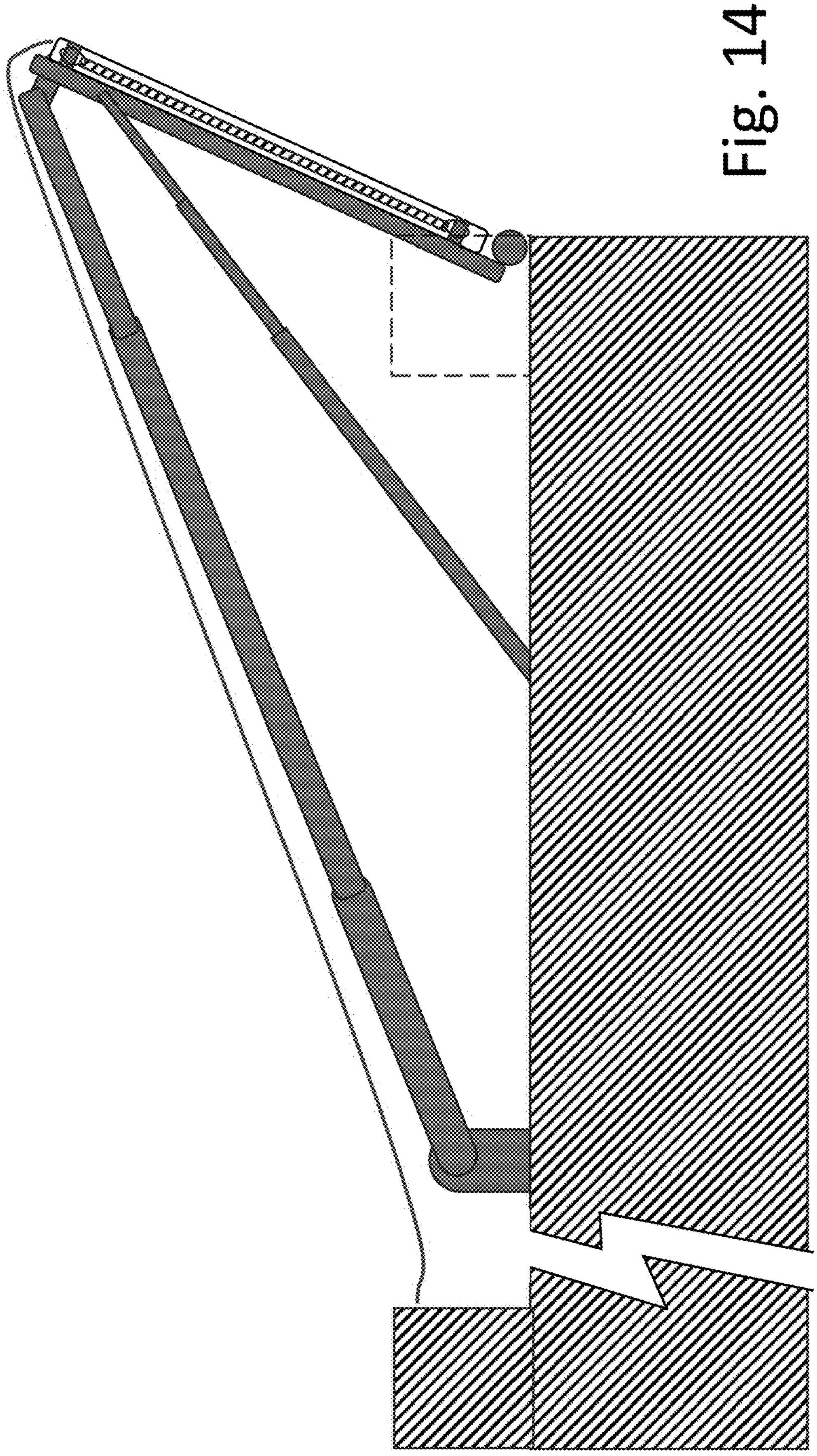

In FIG. 12, the first telescopic shaft 103 is locked at its length and the second telescopic shaft 110 extends, thereby rotating the first telescopic shaft 103 upwards. In FIGS. 13 and 14 one of the shafts 103 and 110 is extended while the second one of the shafts 103 and 110 is unlocked and allowed to extend as a result of the extension of the other shaft. Alternatively, both shafts 103 and 110 are actuated to extend, albeit at different rates. Therefore, the protective casing 106 is moved forward and upward.

Figure 15:
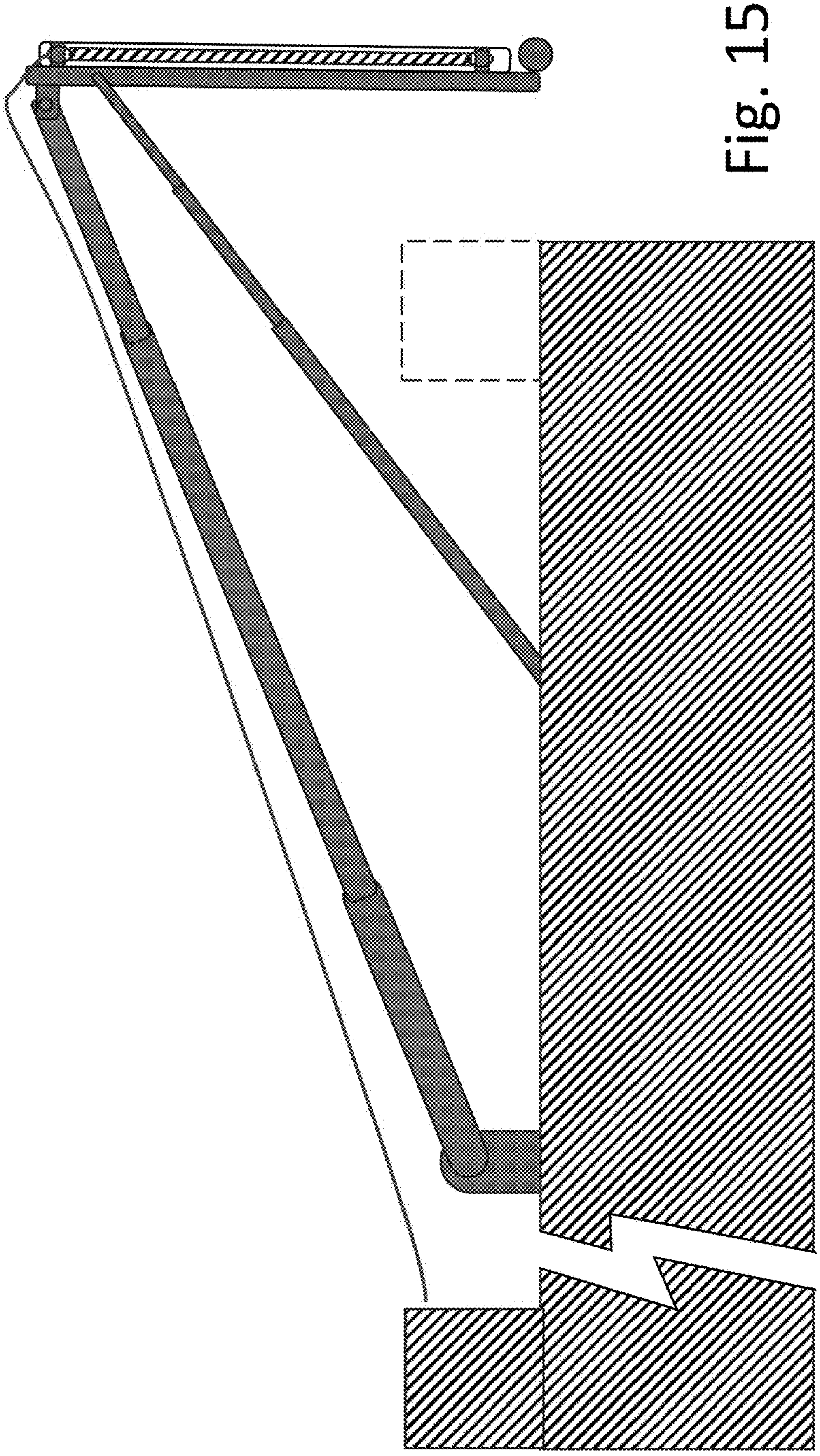
Figure 16:
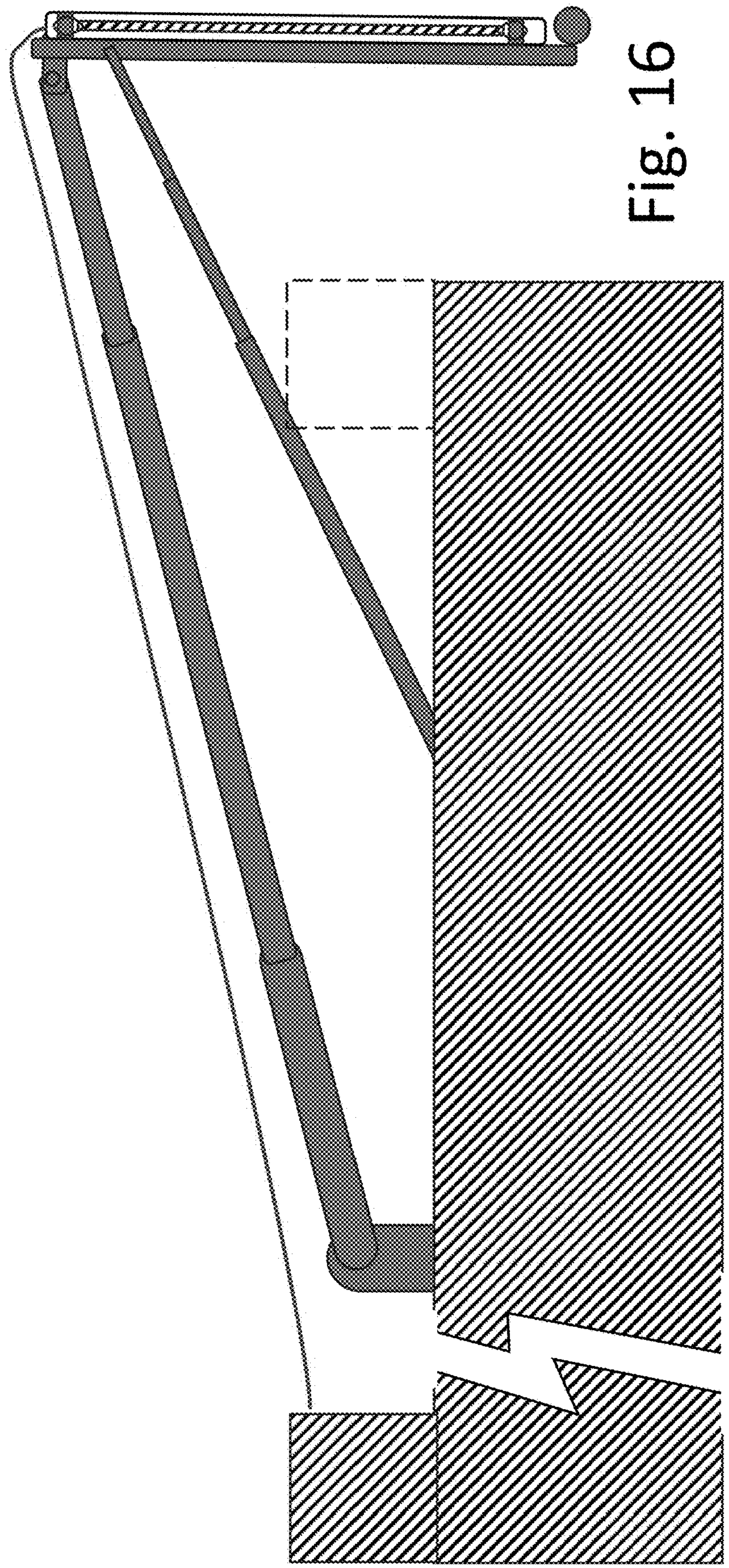
Figure 17:
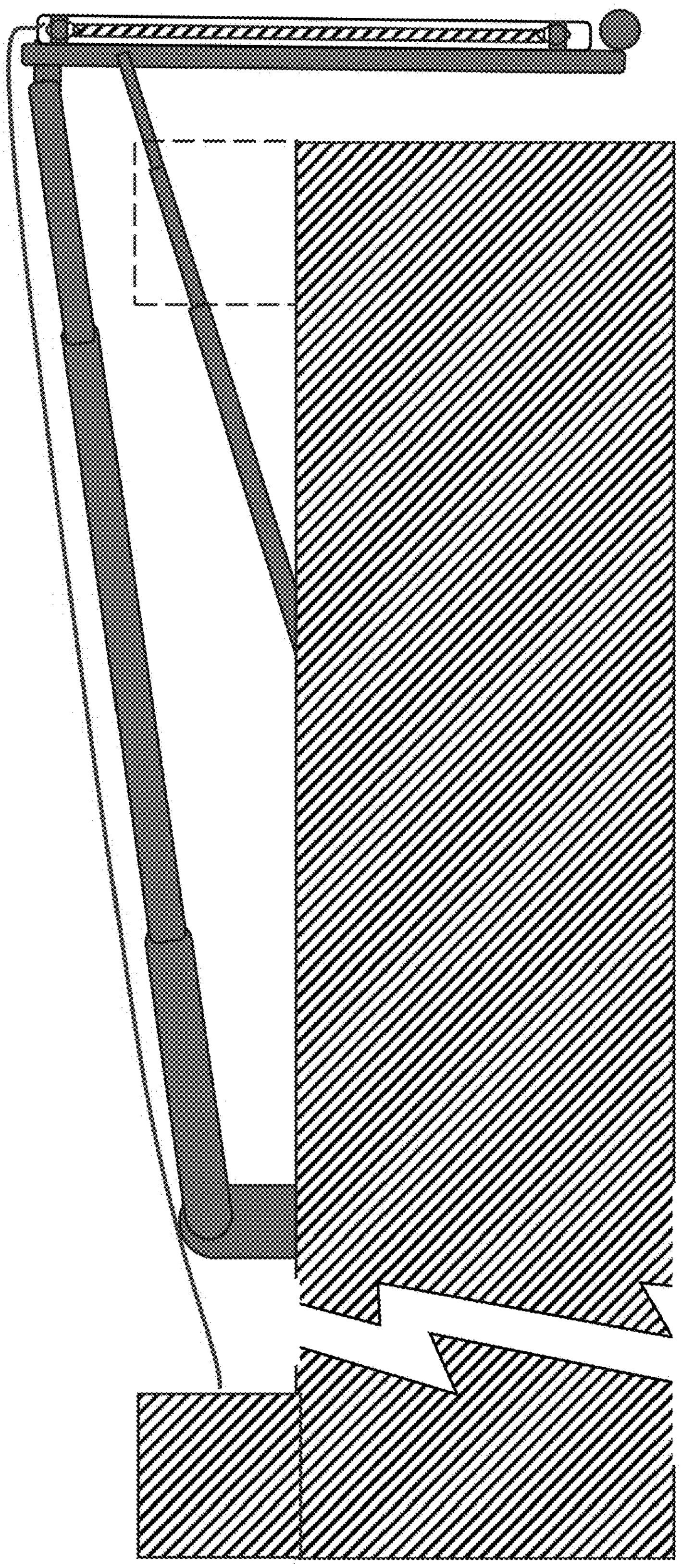
Figure 18:
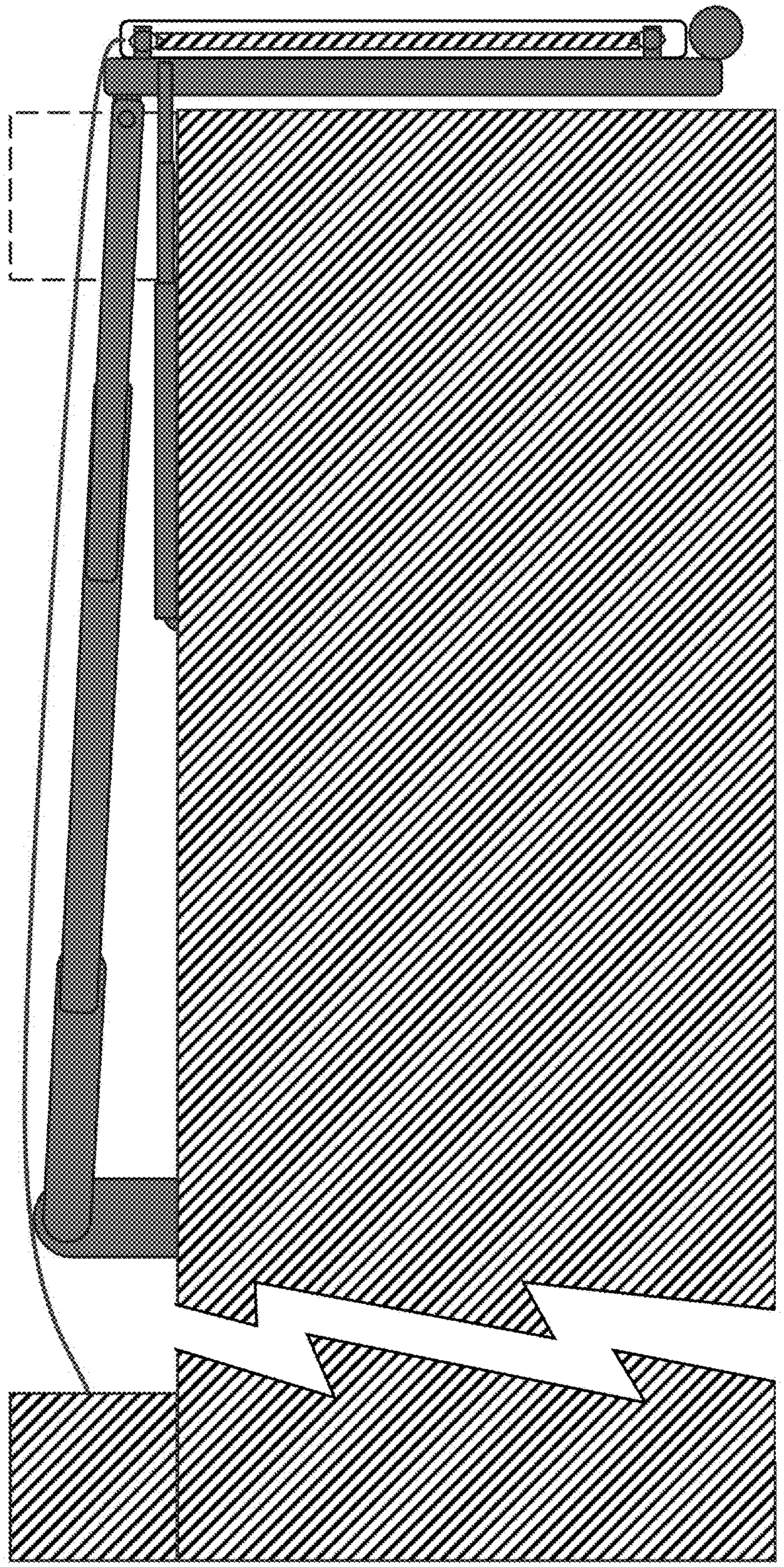

In FIG. 15, contact between the roof and the wheel is lost and the protective casing 106 hangs beyond the side of the roof. In FIG. 16-18, at least one of the shafts 103 and 110 is actuated to retract, while the second one of the shafts 103 and 110 is unlocked and allowed to retract as a result of the retraction of the other shaft. Alternatively, both shafts 103 and 110 are actuated to retract, albeit at different rates. Therefore, the protective casing 106 is moved downward and backward, so that the protective casing hangs ahead of the side of the roof, and has a rear side that is substantially flush with the side of the roof and optionally contacts the side of the roof.

In the configuration of FIG. 18, the advertising item is located on the side of the roof and can be viewed.

FIG. 21 is a box diagram illustrating the control of the motion of the advertising system, according to some embodiments of the present invention.

The control unit 300 is configured to control an operation of the first telescopic shaft 103 and the second telescopic shaft 110 to move the protective casing to one or more desired locations.

In a variant, the control unit 300 includes a processing unit 302, a signal generator 304, and a non-transitory memory unit 306. The non-transitory memory unit 306 stores machine-readable instructions for controlling the first telescopic shaft 103 and the second telescopic shaft 110 to move the protective casing from a predetermined initial position to a predetermined final position.

The processor 302 is configured to process the machine-readable instructions and output instructions accordingly. The signal generator 304 unit is configured to generate control signals for operating the first actuator 104 and the second actuator 112 according to the output instructions, and to transmit the control signals to the first actuator 104 and the second actuator 112 according to a timing defined in the control instructions.

The signals may cause the shafts to extend, retract, or be locked at a certain length, or be unlocked. Non-limiting examples of these operations were illustrated above, with reference to FIGS. 2-18.

Figure 22:
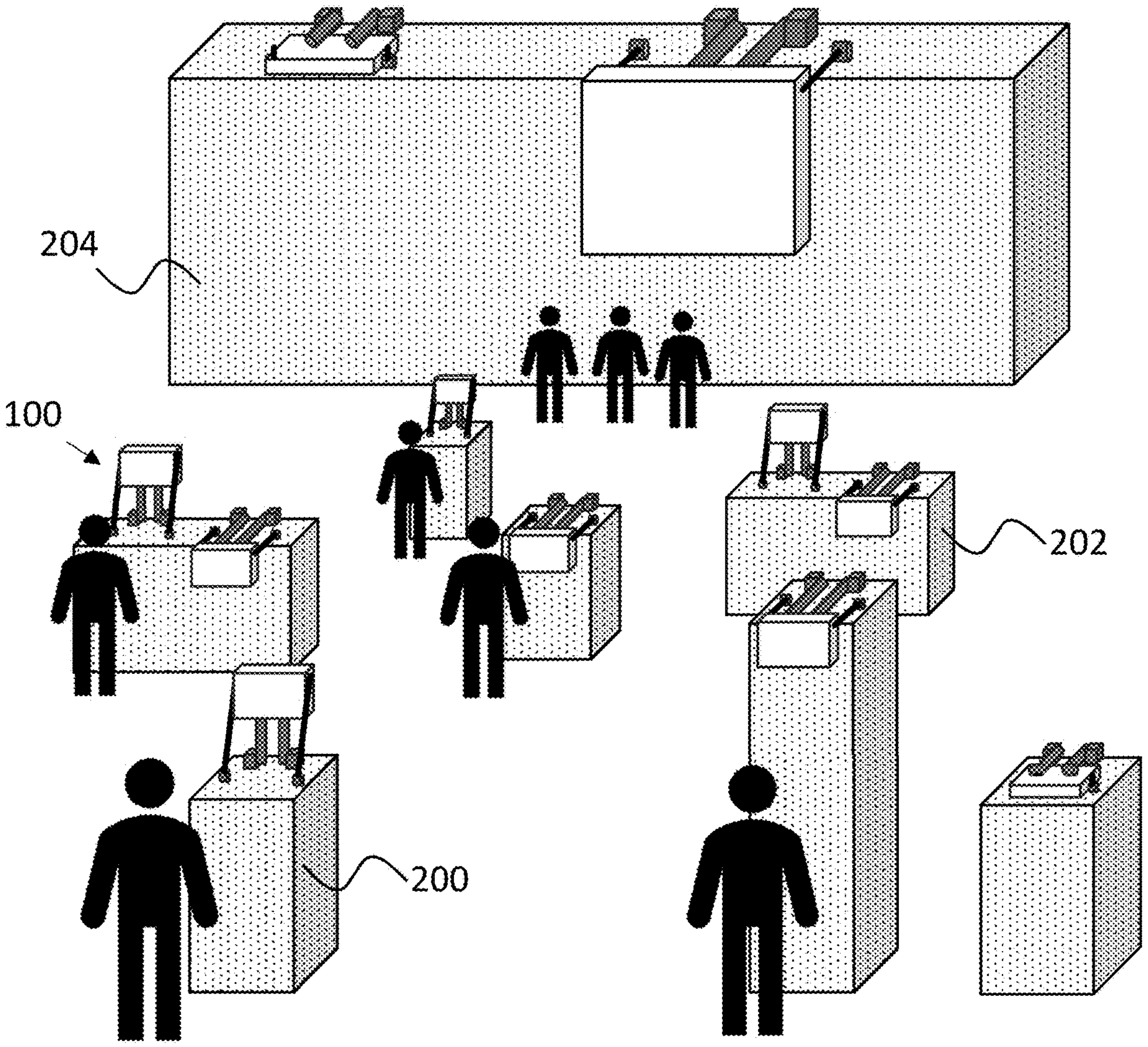
FIG. 22 illustrates the use of the system holding an advertising item in a showroom, according to some embodiments of the present invention.

FIG. 22 illustrates the use of the system holding an advertising item in a showroom, according to some embodiments of the present invention.

The showroom includes a plurality of pedestals 200 and/or tables 202. The pedestal and/or tables have upper surfaces (roofs) upon which one or more systems 100 are installed. Some of the systems 100 may be in the vertical configuration for displaying advertising items above the roofs. Other systems 100 may be in the hanging configuration, for displaying configurations on the sides of the roofs. Finally, one or more of the systems 100 may be in a retracted horizontal configuration, and not in display mode. This may occur, for example, if there is no advertising item inside the protective casing of the system, or if the advertising item needs to be repaired or replaced.

The showroom may also include a large body 204 (such as a container) upon which one or more larger systems 100 are installed, for example, to contain large screens for displaying videos.

What is claimed is:

1. A system for advertising on a roof, the system comprising:
- a protective casing configured to contain an advertising item;
- an automated actuating assembly joined to the protective casing and configured to move the protective casing between a retracted configuration and a standing configuration;
- wherein in the retracted configuration the protective casing is configured to be oriented to be parallel to a roof;
- wherein in the standing configuration, the protective casing is oriented vertically and is configured to have an elevation above an upper surface of the roof that is adjustable to be at any one of a plurality of predetermined heights.

2. The system of claim 1, wherein in the standing configuration, the plurality of predetermined heights includes predetermined discrete heights above the upper surface of the roof or includes all the heights within a range between a minimal height above the upper surface of the roof and a maximal height above the upper surface of the roof.

3. The system of claim 1, wherein the automated actuating assembly is further configured to move the protective casing to a hanging configuration, in which the protective casing is oriented vertically and configured to hang ahead of a side of the roof.

4. The system of claim 3, comprising a cord configured to be anchored to the roof and being joined to the protective casing;
- wherein the cord is slack when the protective casing is in the retracted configuration;
- wherein the cord tenses when the protective casing is moved to the hanging configuration.

5. The system of claim 1, wherein the automated actuating assembly comprises:
- at least one first telescopic shaft having a first end and a second end, the first end being configured to be rotatably joined to an upper surface of the roof and the second end being rotatably joined to the protective casing, wherein the at least one first telescopic shaft is extendable along a central axis of the at least one first telescopic shaft and is rotatable about a horizontal axis;
- a first actuator configured to control an extension and retraction of the at least one first telescopic shaft;
- at least one second telescopic shaft configured to be rotatably joined to the upper surface of the roof and being rotatably joined to the protective casing;
- a second actuator configured to control an extension and retraction of the at least one second telescopic shaft.

6. The system of claim 5, wherein the protective casing comprises:
- a rear plate having a rear surface rotatably joined to the second end of the at least one first telescopic shaft;
- a transparent sheath joined to a front surface of the rear plate and configured to contain the advertising item.

7. The system of claim 6, comprising a retention apparatus configured to retain the advertising item firmly joined to the rear plate inside the transparent sheath.

8. The system of claim 6, wherein the transparent sheath is removably joined to a front surface of the rear plate.

9. The system of claim 5, comprising a control unit configured to control an operation of the at least one first telescopic shaft and the at least one second telescopic shaft to move the protective casing to one or more desired locations.

10. The system of claim 9, wherein the control unit comprises a processing unit, a signal generator, and a non-transitory memory unit, the non-transitory memory unit storing machine-readable instructions for controlling the at least one first telescopic shaft and the at least one second telescopic shaft to move the protective casing from a predetermined initial position to a predetermined final position;
- wherein the processing unit is configured to process the machine-readable instructions and to generate output instructions accordingly;
- wherein the signal generator is configured to generate control signals for operating the first actuator and the second actuator according to the output instructions, and to transmit the control signals to the first actuator and the second actuator according to a timing defined in the output instructions.

11. The system of claim 1, comprising at least a wheel joined to the protective casing, and configured to ease a motion of the protective casing on the roof.

12. The system of claim 1, comprising at least a damping unit joined to a front surface of the protective casing, and configured to prevent direct contact between the protective casing and the roof when the protective casing is in the retracted configuration, wherein the damping unit comprises a vibration absorbing material.

13. The system of claim 1, comprising a locking apparatus joined to the protective casing and configured to be remotely controllable for locking the protective casing to the roof.

14. The system of claim 1, wherein the protective casing is waterproof.

15. The system of claim 1, wherein the protective casing is configured to cover an advertising item from at least front and back.

16. The system of claim 1, wherein the protective casing is configured to envelop the advertising item from all sides.

17. A system for advertising on a roof, the system comprising:

a protective casing configured to contain an advertising item;

an automated actuating assembly joined to the protective casing and configured to move the protective casing between a retracted configuration and a hanging configuration;

wherein in the retracted configuration the protective casing is configured to be oriented to be parallel to a roof;

wherein in the hanging configuration, the protective casing is oriented vertically and configured for hanging ahead of a side of the roof.

18. The system of claim 17, wherein the automated actuating assembly is further configured to move the protective casing to a standing configuration, wherein in the standing configuration, the protective casing is oriented vertically and is configured to have an elevation above an upper surface of the roof.

* * * * *